United States Patent
Satoh et al.

(10) Patent No.: US 9,541,125 B1
(45) Date of Patent: Jan. 10, 2017

(54) JOINT LOCKING MECHANISM

(71) Applicant: Amazon Technologies, Inc., Seattle, WA (US)

(72) Inventors: Juli A. Satoh, San Jose, CA (US); Christopher D. Coley, Morgan Hill, CA (US); Navid Poulad, Sunnyvale, CA (US); Colter E. Cederlof, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 468 days.

(21) Appl. No.: 13/689,401

(22) Filed: Nov. 29, 2012

(51) Int. Cl.
*F16C 11/00* (2006.01)
*F16D 3/00* (2006.01)
*F16C 11/10* (2006.01)

(52) U.S. Cl.
CPC ........ *F16C 11/10* (2013.01); *Y10T 403/32262* (2015.01)

(58) Field of Classification Search
CPC .............. F16C 11/10; Y10T 403/32262; Y10T 403/32327
USPC .. 256/25, 26; 403/84, 92; 361/679.01–679.3
See application file for complete search history.

(56) References Cited

U.S. PATENT DOCUMENTS

| | | | |
|---|---|---|---|
| 6,555,804 B1 * | 4/2003 | Blasing ...................... 250/208.1 |
| 7,089,099 B2 * | 8/2006 | Shostak et al. ............. 701/29.6 |
| 7,418,392 B1 | 8/2008 | Mozer et al. | |
| 7,720,683 B1 | 5/2010 | Vermeulen et al. | |
| 7,774,204 B2 | 8/2010 | Mozer et al. | |
| 8,171,439 B2 * | 5/2012 | Sato .............................. 716/106 |
| 2008/0151692 A1 * | 6/2008 | Dijk et al. .................... 367/127 |
| 2010/0079309 A1 * | 4/2010 | Filson et al. .................... 341/20 |
| 2011/0160966 A1 * | 6/2011 | Witte .............................. 701/45 |
| 2012/0223885 A1 | 9/2012 | Perez | |

FOREIGN PATENT DOCUMENTS

WO   WO2011088053 A2   7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

\* cited by examiner

*Primary Examiner* — Gregory Binda
*Assistant Examiner* — Nahid Amiri
(74) *Attorney, Agent, or Firm* — Lee & Hayes, PLLC

(57) ABSTRACT

Projection and camera systems may employ a joint locking mechanism that may enable a user to reposition or move structures (arms, lenses, etc.) that are otherwise locked in position. The joint locking mechanism may include a touch-activated presence detector to sense a presence of an extremity of a user. In response to the presence detector sensing the presence, an actuator may unlock a joint or structure to enable movement of the joint or structure while the presence detector continues to sense the presence. In response to a detection of an absence of the extremity, the actuator may return to a locked state to prevent further movement of the joint or structure.

26 Claims, 16 Drawing Sheets

JOINT LOCKING MECHANISM

BACKGROUND

Augmented reality allows interaction among users, real-world objects, and virtual or computer-generated objects and information within an environment. The environment may be, for example, a room equipped with computerized projection and imaging systems that enable presentation of images on various objects within the room and facilitate user interaction with the images and/or objects. The augmented reality may range in sophistication from partial augmentation, such as projecting a single image onto a surface and monitoring user interaction with the image, to full augmentation where an entire room is transformed into another reality for the user's senses. The user can interact with the environment in many ways, including through motion, gestures, voice, and so forth.

To enable such augmented reality environments, however, there is a continuing need for improved projection systems. Such improvements might include increased ease of repositioning and movement of the projection system or components thereof.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Augmented reality environments allow users to interact with physical and virtual objects in a physical space. Augmented reality environments are formed through systems of resources such as cameras, projectors, computing devices with processing and memory capabilities, and so forth. The projectors project images onto the surroundings that define the environment and the cameras monitor and capture user interactions with such images.

Described herein is an architecture to create an augmented reality environment. The architecture may be implemented in many ways. One illustrative implementation is described below in which an augmented reality environment is created within a room. The architecture includes one or more projection and camera systems. Multiple implementations of various projection and camera systems are described. For instance, in one implementation, the projection and camera system is implemented as a table lamp.

In addition, the projection and camera systems, or other devices and systems, may employ a joint locking mechanism that may enable a user to quickly and easily reposition or move structures (arms, lenses, etc.) that are otherwise locked in position. The joint locking mechanism may be in communication with a presence detector to sense presence of an extremity of a user. The presence of the extremity may include presence of the extremity (e.g., hand, finger(s), etc.) within a predetermined distance of the presence detector, including contact with the presence detector. For example, the presence detector may be a touch sensor. In response to the presence detector sensing the presence of the extremity, an actuator may unlock a joint or structure to enable movement of the joint or structure while the presence detector continues to sense the presence of the extremity. In response to sensing of an absence of the extremity, the actuator may return to a locked state to prevent movement of the joint or structure.

The techniques and systems described herein may be implemented in a number of ways. Example implementations are provided below with reference to the following figures.

Figure 1:
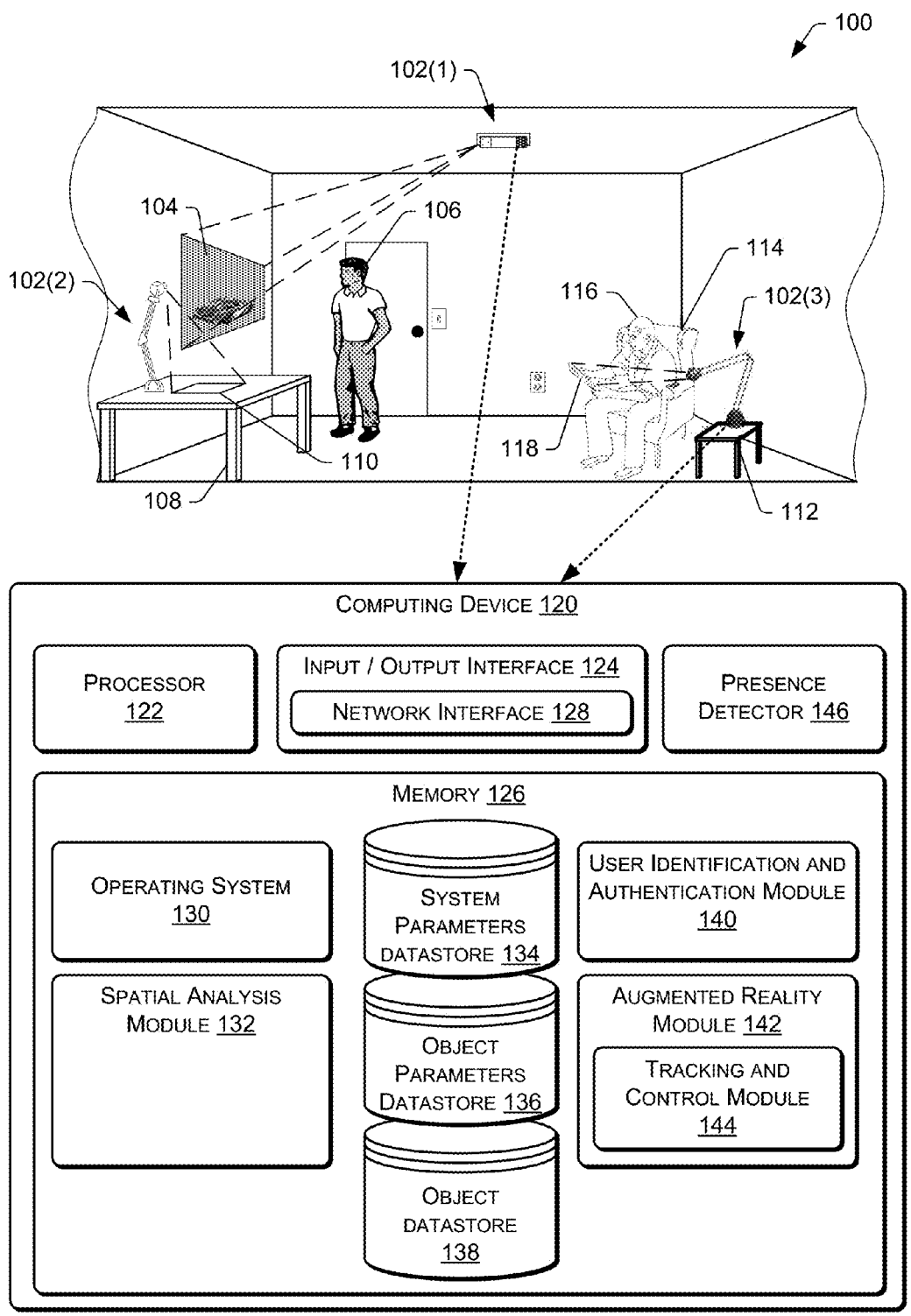
FIG. 1 shows an illustrative scene with an augmented reality environment hosted in an environmental area, such as a room. The augmented reality environment is provided, in part, by three projection and image capture systems.

FIG. 1 shows an illustrative augmented reality environment 100 created within a scene, and hosted within an environmental area, which in this case is a room. Three augmented reality functional nodes (ARFN) 102(1)-(3) are shown within the room. Each ARFN contains projectors, cameras, and computing resources that are used to generate the augmented reality environment 100. In this illustration, the first ARFN 102(1) is a fixed mount system that may be mounted within the room, such as to the ceiling, although other placements are possible. The first ARFN 102(1) projects images onto the scene, such as onto a surface or screen 104 on a wall of the room. A first user 106 may watch and interact with the images being projected onto the wall, and the ceiling-mounted ARFN 102(1) may capture that interaction. One implementation of the first ARFN 102(1) is provided below in more detail with reference to FIG. 2.

A second ARFN 102(2) is embodied as a table lamp, which is shown sitting on a desk 108. The second ARFN 102(2) projects images 110 onto the surface of the desk 108 for the user 106 to consume and interact. The projected images 110 may be of any number of things, such as homework, video games, news, or recipes.

A third ARFN 102(3) is also embodied as a table lamp, shown sitting on a small table 112 next to a chair 114. A second user 116 is seated in the chair and is holding a portable projection screen 118. The third ARFN 102(3) projects images onto the surface of the portable screen 118 for the user 116 to consume and interact. The projected images may be of any number of things, such as books, games (e.g., crosswords, Sudoku, etc.), news, magazines, movies, browser, etc. The portable screen 118 may be essentially any device for use within an augmented reality environment, and may be provided in several form factors. It may range from an entirely passive, non-electronic, mechanical surface to a full functioning, full processing, electronic device with a projection surface.

These are just sample locations. In other implementations, one or more ARFNs may be placed around the room in any number of arrangements, such as on in furniture, on the wall, beneath a table, and so forth.

Associated with each ARFN 102(1)-(3), or with a collection of ARFNs, is a computing device 120, which may be located within the augmented reality environment 100 or disposed at another location external to it. Each ARFN 102 may be connected to the computing device 120 via a wired network, a wireless network, or a combination of the two. The computing device 120 has a processor 122, an input/output interface 124, and a memory 126. The processor 122 may include one or more processors configured to execute instructions. The instructions may be stored in memory 126, or in other memory accessible to the processor 122, such as storage in cloud-based resources.

The input/output interface 124 may be configured to couple the computing device 120 to other components, such as projectors, cameras, microphones, other ARFNs, other computing devices, and so forth. The input/output interface 124 may further include a network interface 128 that facilitates connection to a remote computing system, such as cloud computing resources. The network interface 128 enables access to one or more network types, including wired and wireless networks. More generally, the coupling between the computing device 120 and any components may be via wired technologies (e.g., wires, fiber optic cable, etc.), wireless technologies (e.g., RF, cellular, satellite, Bluetooth, etc.), or other connection technologies.

The memory 126 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 126 and configured to execute on a processor, such as the processor 122. An operating system module 130 is configured to manage hardware and services within and coupled to the computing device 120 for the benefit of other modules.

A spatial analysis module 132 is configured to perform several functions which may include analyzing a scene to generate a topology, recognizing objects in the scene, dimensioning the objects, and creating a 3D model of the scene. Characterization may be facilitated using several technologies including structured light, light detection and ranging (LIDAR), optical time-of-flight, ultrasonic ranging, stereoscopic imaging, radar, and so forth either alone or in combination with one another. For convenience, and not by way of limitation, some of the examples in this disclosure refer to structured light although other techniques may be used. The spatial analysis module 132 provides the information used within the augmented reality environment to provide an interface between the physicality of the scene and virtual objects and information.

A system parameters datastore 134 is configured to maintain information about the state of the computing device 120, the input/output devices of the ARFN, and so forth. For example, system parameters may include current pan and tilt settings of the cameras and projectors. As used in this disclosure, the datastore includes lists, arrays, databases, and other data structures used to provide storage and retrieval of data.

An object parameters datastore 136 in the memory 126 is configured to maintain information about the state of objects within the scene. The object parameters may include the surface contour of the object, overall reflectivity, color, and so forth. This information may be acquired from the ARFN, other input devices, or via manual input and stored within the object parameters datastore 136.

An object datastore 138 is configured to maintain a library of pre-loaded reference objects. This information may include assumptions about the object, dimensions, and so forth. For example, the object datastore 138 may include a reference object of a beverage can and include the assumptions that beverage cans are either held by a user or sit on a surface, and are not present on walls or ceilings. The spatial analysis module 132 may use this data maintained in the datastore 138 to test dimensional assumptions when determining the dimensions of objects within the scene. In some implementations, the object parameters in the object parameters datastore 136 may be incorporated into the object datastore 138. For example, objects in the scene which are temporally persistent, such as walls, a particular table, particular users, and so forth may be stored within the object datastore 138. The object datastore 138 may be stored on one or more of the memory of the ARFN, storage devices accessible on the local network, or cloud storage accessible via a wide area network.

A user identification and authentication module 140 is stored in memory 126 and executed on the processor(s) 122 to use one or more techniques to verify users within the environment 100. In one implementation, the ARFN 102 may capture an image of the user's face and the spatial analysis module 132 reconstructs 3D representations of the user's face. Rather than 3D representations, other biometric profiles may be computed, such as a face profile that includes key biometric parameters such as distance between eyes, location of nose relative to eyes, etc. In such profiles, less data is used than full reconstructed 3D images. The user identification and authentication module 140 can then match the reconstructed images (or other biometric parameters) against a database of images (or parameters), which may be stored locally or remotely on a storage system or in the cloud, for purposes of authenticating the user. If a match is detected, the user is permitted to interact with the system.

An augmented reality module 142 is configured to generate augmented reality output in concert with the physical environment. The augmented reality module 142 may employ essentially any surface, object, or device within the environment 100 to interact with the users. The augmented reality module 142 may be used to track items within the environment that were previously identified by the spatial analysis module 132. The augmented reality module 142 includes a tracking and control module 144 configured to track one or more items within the scene and accept inputs from or relating to the items.

The computing device 120 may include a presence detector 146 to detect a presence of an extremity of a user, such as a finger, hand, or tool controlled by the user. The presence detector 146 may selectively communicate signals, directly or indirectly, to a joint locking mechanism to enable or disable movement of (e.g., lock/unlock) structures coupled by the joint.

The presence detector 146 may be implemented as one or more of various types of sensors, such as a proximity sensor, an electronic field (e-field) sensor, a capacitance sensor, a resistive touch sensor, a camera, and/or other types of sensors that can detect a presence of the extremity near or against a surface. In some instances, the presence detector 146 may measure an amount of pressure (i.e., force) caused by contact by the extremity and/or measure a size of an area of a surface that is contacted by the extremity. The presence detector 146 may be configured approximately measure or detect a distance and/or change in distance between the extremity and a surface. The presence detector 146 may be configured to detect a presence of the extremity within a threshold distance from the presence detector 146 and/or another object, such as a surface that is connected to a joint.

The ARFNs 102 and computing components of device 120 that have been described thus far may be operated to create an augmented reality environment in which images are projected onto various surfaces and items in the room, and the users 106 and 116 may interact with the images. The users' movements, voice commands, and other interactions are captured by the ARFNs 102 to facilitate user input to the environment.

Figure 2:
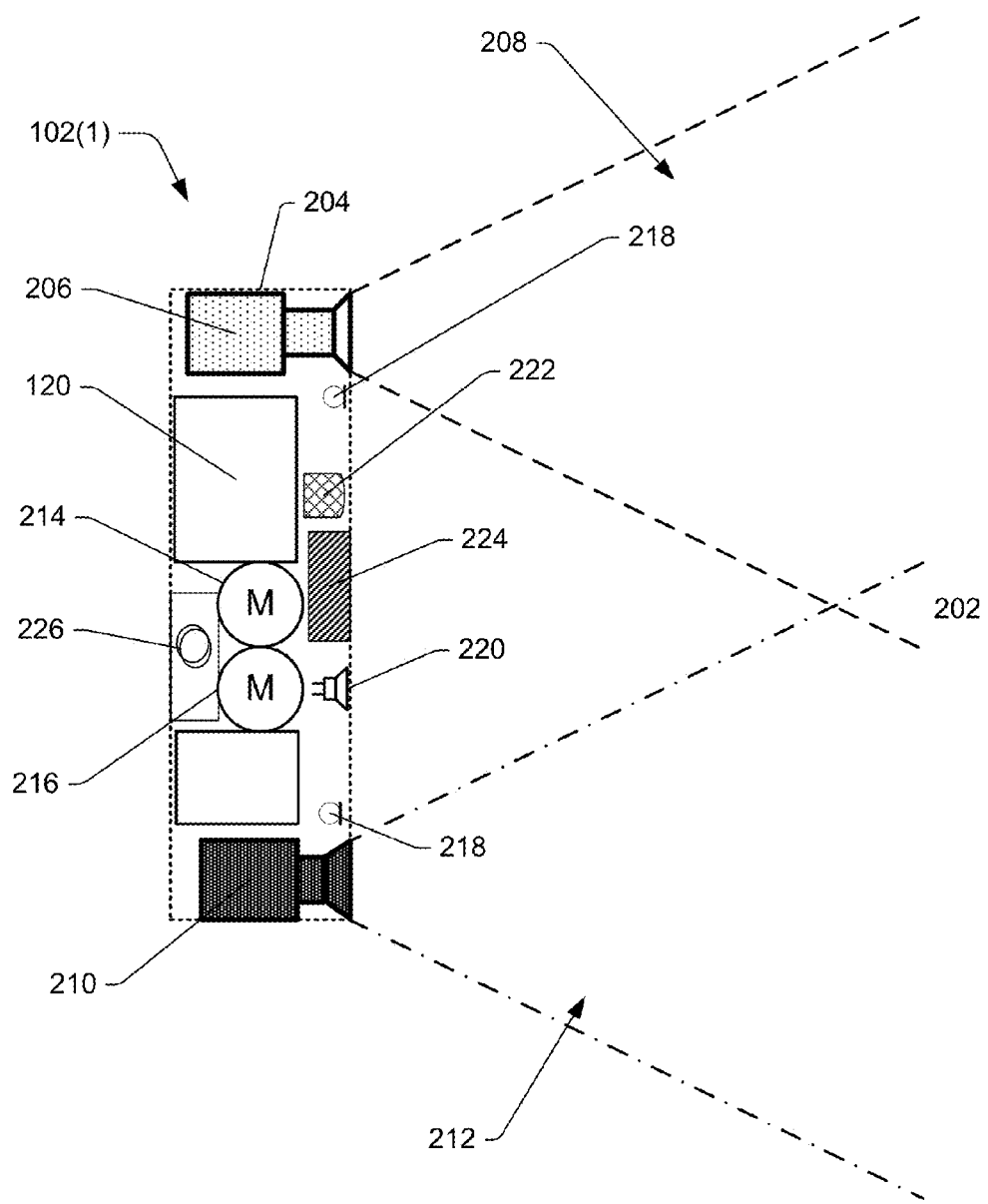
FIG. 2 shows a first implementation of a projection and image capturing system formed as an augmented reality functional node (ARFN) having a chassis to hold a projector and camera in spaced relation to one another. In this implementation, the projector and camera have different optic paths.

FIG. 2 shows an illustrative schematic 200 of the first augmented reality functional node 102(1) and selected components. The first ARFN 102(1) is configured to scan at least a portion of a scene 202 and the objects therein. The ARFN 102(1) may also be configured to provide augmented reality output, such as images, sounds, and so forth.

A chassis 204 holds the components of the ARFN 102(1). Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used. Further, in some implementations, the projector 206 may be further configured to project patterns, such as non-visible infrared patterns, that can be detected by camera(s) and used for 3D reconstruction and modeling of the environment. The projector 206 may comprise a microlaser projector, a digital light projector (DLP), cathode ray tube (CRT) projector, liquid crystal display (LCD) projector, light emitting diode (LED) projector or the like.

A camera 210 may also be disposed within the chassis 204. The camera 210 is configured to image the scene in visible light wavelengths, non-visible light wavelengths, or both. The camera 210 may be implemented in several ways. In some instances, the camera may be embodied an RGB camera. In other instances, the camera may include ToF sensors. In still other instances, the camera 210 may be an RGBZ camera that includes both ToF and RGB sensors. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation, the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated to initiate an augmented reality function. The user may alternatively use voice commands. Such audio inputs may be located within the scene using time-of-arrival differences among the microphones and used to summon an active zone within the augmented reality environment. Further, the microphones 218 may be used to receive voice input from the user for purposes of identifying and authenticating the user. The voice input may be received and passed to the user identification and authentication module 122 in the computing device 104 for analysis and verification.

One or more speakers 220 may also be present to provide for audible output. For example, the speakers 220 may be used to provide output from a text-to-speech module, to playback pre-recorded audio, etc.

A transducer 222 may be present within the ARFN 102(1), or elsewhere within the environment, and configured to detect and/or generate inaudible signals, such as infrasound or ultrasound. The transducer may also employ visible or non-visible light to facilitate communication. These inaudible signals may be used to provide for signaling between accessory devices and the ARFN 102(1).

A ranging system 224 may also be provided in the ARFN 102 to provide distance information from the ARFN 102 to an object or set of objects. The ranging system 224 may comprise radar, light detection and ranging (LIDAR), ultrasonic ranging, stereoscopic ranging, and so forth. In some implementations, the transducer 222, the microphones 218, the speaker 220, or a combination thereof may be configured to use echolocation or echo-ranging to determine distance and spatial characteristics.

A wireless power transmitter 226 may also be present in the ARFN 102, or elsewhere within the augmented reality environment. The wireless power transmitter 226 is configured to transmit electromagnetic fields suitable for recovery by a wireless power receiver and conversion into electrical power for use by active components in other electronics, such as a non-passive screen 118. The wireless power transmitter 226 may also be configured to transmit visible or non-visible light to communicate power. The wireless power transmitter 226 may utilize inductive coupling, resonant coupling, capacitive coupling, and so forth.

In this illustration, the computing device 120 is shown within the chassis 204. However, in other implementations all or a portion of the computing device 120 may be disposed in another location and coupled to the ARFN 102(1). This coupling may occur via wire, fiber optic cable, wirelessly, or a combination thereof. Furthermore, additional resources external to the ARFN 102(1) may be accessed, such as resources in another ARFN accessible via a local area network, cloud resources accessible via a wide area network connection, or a combination thereof.

In other implementations, the components of the ARFN 102(1) may be distributed in one or more locations within the environment 100. As mentioned above, microphones 218 and speakers 220 may be distributed throughout the scene. The projector 206 and the camera 210 may also be located in separate chassis 204.

Figure 3:
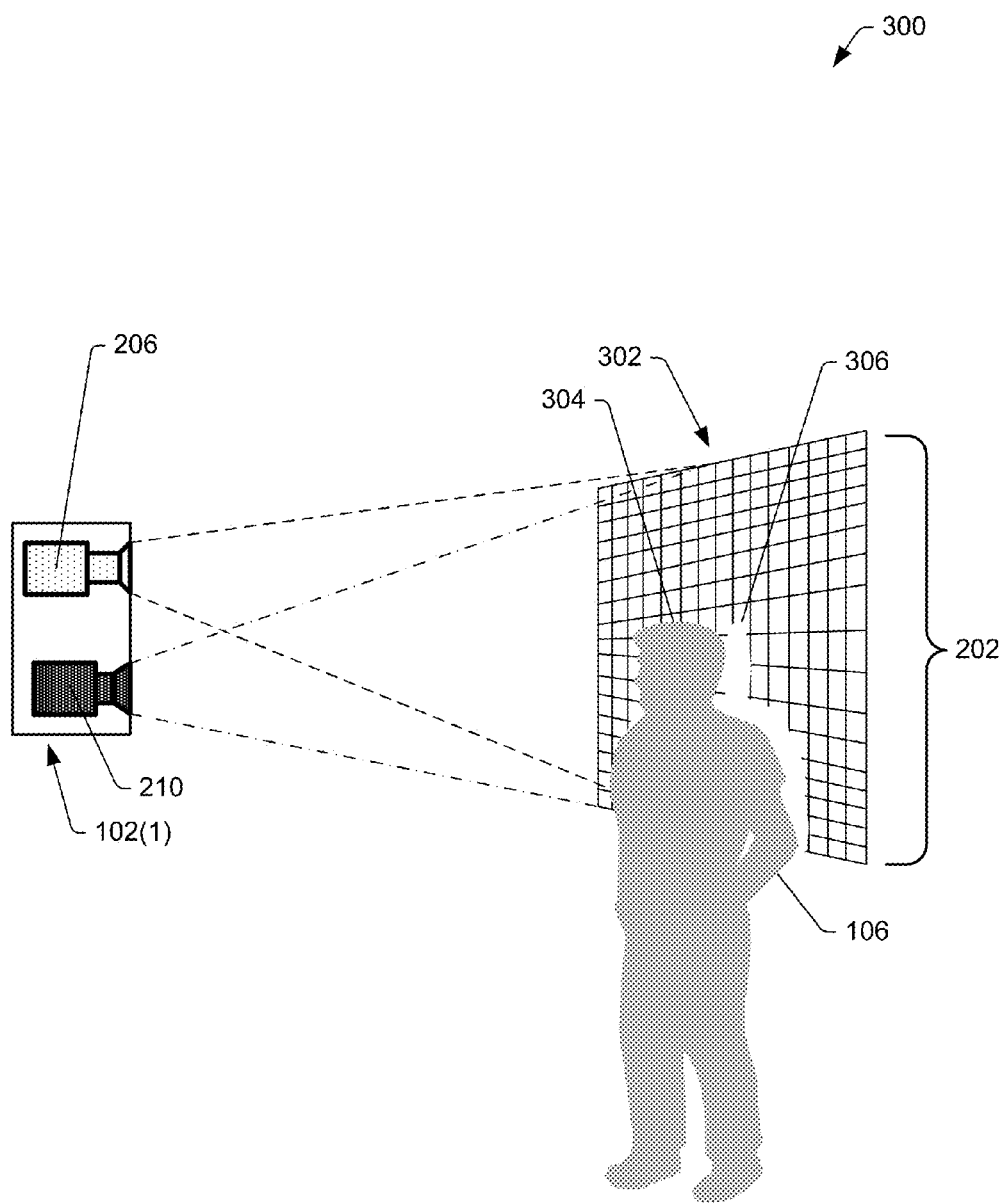
FIG. 3 illustrates one example implementation of creating an augmented reality environment by projecting a structured light pattern on a scene and capturing a corresponding image of the scene.

FIG. 3 illustrates one example operation 300 of the ARFN 102(1) of creating an augmented reality environment by projecting a structured light pattern on a scene and capturing a corresponding image of the scene. In this illustration, the projector 206 within the ARFN 102(1) projects a structured light pattern 302 onto the scene 202. In some implementations, a sequence of different structure light patterns 302 may be used. This structured light pattern 302 may be in wavelengths which are visible to the user, non-visible to the user, or a combination thereof. The structured light pattern 304 is shown as a grid in this example, but not by way of limitation. In other implementations, other patterns may be used, such as bars, dots, pseudorandom noise, and so forth. Pseudorandom noise (PN) patterns are particularly useful because a particular point within the PN pattern may be specifically identified. A PN function is deterministic in that given a specific set of variables, a particular output is defined. This deterministic behavior allows the specific identification and placement of a point or block of pixels within the PN pattern.

The user 106 is shown within the scene 202 such that the user's face 304 is between the projector 206 and a wall. A shadow 306 from the user's body appears on the wall. Further, a deformation effect may be produced on the shape of the user's face 304 as the structured light pattern 302 interacts with the facial features. This deformation effect is detected by the camera 210, which is further configured to sense or detect the structured light. In some implementations, the camera 210 may also sense or detect wavelengths other than those used for structured light pattern 302.

The images captured by the camera 210 may be used for any number of things. For instances, some images of the scene are processed by the spatial analysis module 132 to characterize the scene 202. In some implementations, multiple cameras may be used to acquire the image. In other instances, the images of the user's face 304 (or other body contours, such as hand shape) may be processed by the spatial analysis module 132 to reconstruct 3D images of the user, which are then passed to the user identification and authentication module 140 for purposes of verifying the user.

Certain features of objects within the scene 202 may not be readily determined based upon the geometry of the ARFN 102(1), shape of the objects, distance between the ARFN 102(1) and the objects, and so forth. As a result, the spatial analysis module 132 may be configured to make one or more assumptions about the scene, and test those assumptions to constrain the dimensions of the scene 202 and maintain the model of the scene.

As noted above, the design of the first ARFN 102(1) employs a projector/camera offset where the camera and projector are linearly spaced apart. While this may provide some advantages, one drawback is that the architecture has a comparatively larger form factor as two sets of lenses are used to project and image a scene. Accordingly, another implementation of the ARFN, as represented by the ARFNs 102(2) and 102(3) in FIG. 1, removes the offset through a design that allows the projector and camera to share a common optical path. In this design, the form factor may be reduced. In the example shown in FIG. 1, the ARFNs 102(2) and 102(3) are embodied as common table lamps, where the projector and camera reside in a head of the lamp.

In some embodiments, the operation 300 may include determining a depth map for an environment, such as a room, using time of flight (ToF) of light emitted by a light emitter, such as the projector or another source. The light may reflect off surfaces in the environment and then be detected by a light sensor. The time of flight of the light may be used to determine a depth map of the environment. This depth map may be used to detect objects, such as hands of a person, and to track movement of the objects. One application is to track movement of a person's hands to determine gestures, which may then be used as inputs to control actions of the ARFN 102(1), 102(2) and/or 102(3).

Figure 4:
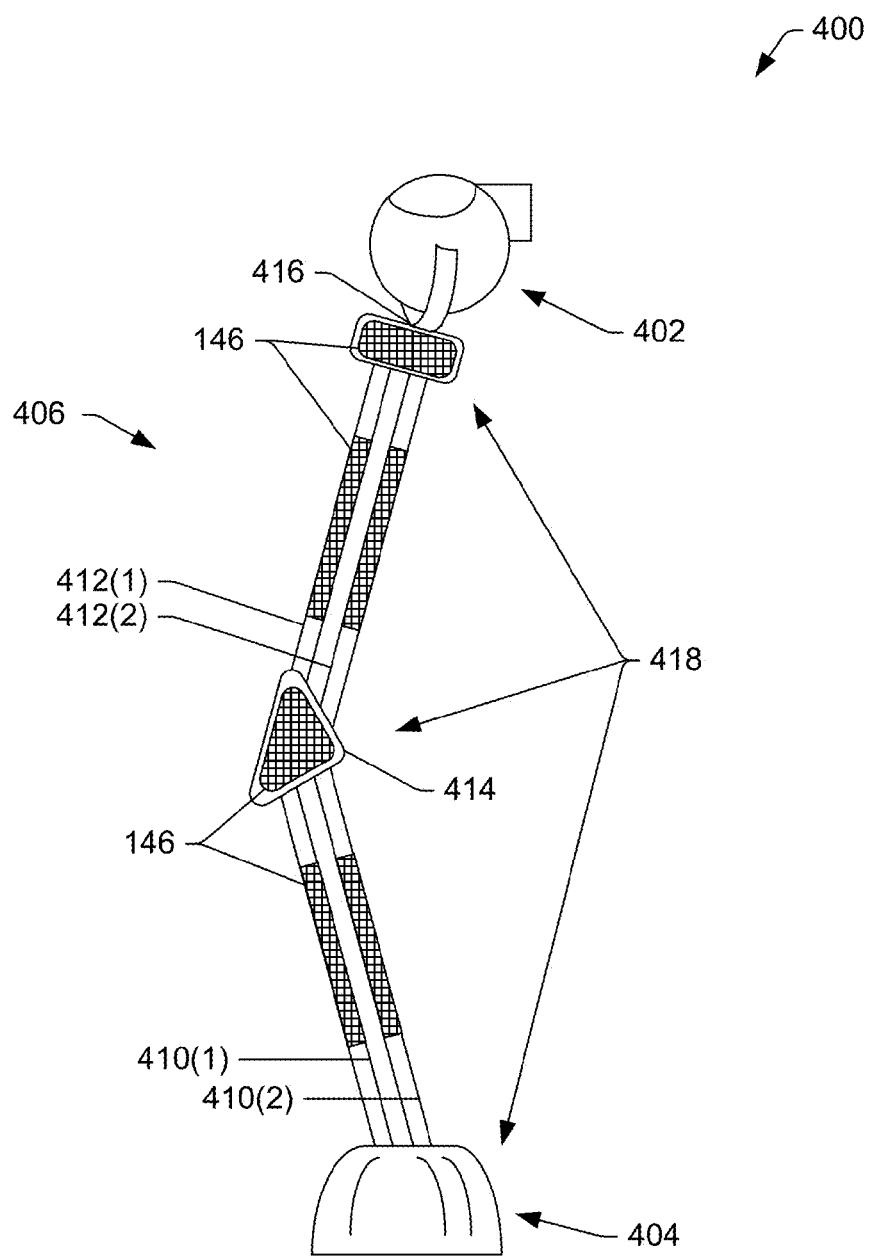
FIG. 4 shows a second implementation of a projection and image capturing system formed as a familiar type of furniture, such as a table lamp. In this implementation, the projector and camera share a common optical path through a common lens.

FIG. 4 shows one implementation of the ARFN 102(2) or 102(3), implemented as part of a table lamp, although it may be incorporated into other familiar types of furniture. Further, the optical components described in this implementation may be embodied in non-furniture arrangement, such as a standalone unit placed in the room or mounted to the ceiling or walls (i.e., similar to the ARFN 102(1) described above), or incorporated into fixtures such as a ceiling light fixture. The table lamp 400 has a head 402 attached to a base 404 by a movable arm mechanism 406. As illustrated, the arm mechanism 406 has two base members or rods 410(1) and 410(2) connected to two head members or rods 412(1) and 412(2) via a joint connector 414. Other configurations of the arm mechanism 406 may be used. In the illustrated implementation, the head 402 is connected to the arm mechanism 406 via a universal connector 416 that enables at least two degrees of freedom (e.g., along tilt and pan axes). In other implementations, the head 402 may be mounted to the arm mechanism 406 in a fixed manner, with no movement relative to the arm mechanism 406, or in a manner that enables more or less than two degrees of freedom. The head 402 may hold several components, including a projector and a time of flight (ToF) sensor.

In accordance with various embodiments, the table lamp 400 (or other type of movable apparatus) may include a joint locking mechanism 418 at or near the arm mechanism 406, the base 404, the universal connector 416, and/or between other movable structures. The joint locking mechanism 418 may selectively lock and unlock one or more joints in response to signals received from the presence detector 146. For example, the joint locking mechanism 418 may unlock a joint and thereby allow movement of a structure when the presence detector 146 detects a touch by an extremity of a user. The user may quickly and easily adjust a position of the head 402 (or other structure) by touching one of the presence detectors 146 and moving or repositioning at least part of the structures, once unlocked by the joint locking mechanism 418. Prior to or immediately following removal of the extremity of the user, the presence detectors 146 may transmit a signal to cause the joint locking mechanism to lock the joint and thus maintain a new position of the structures following the repositioning of the structures caused by the user.

Figure 5:
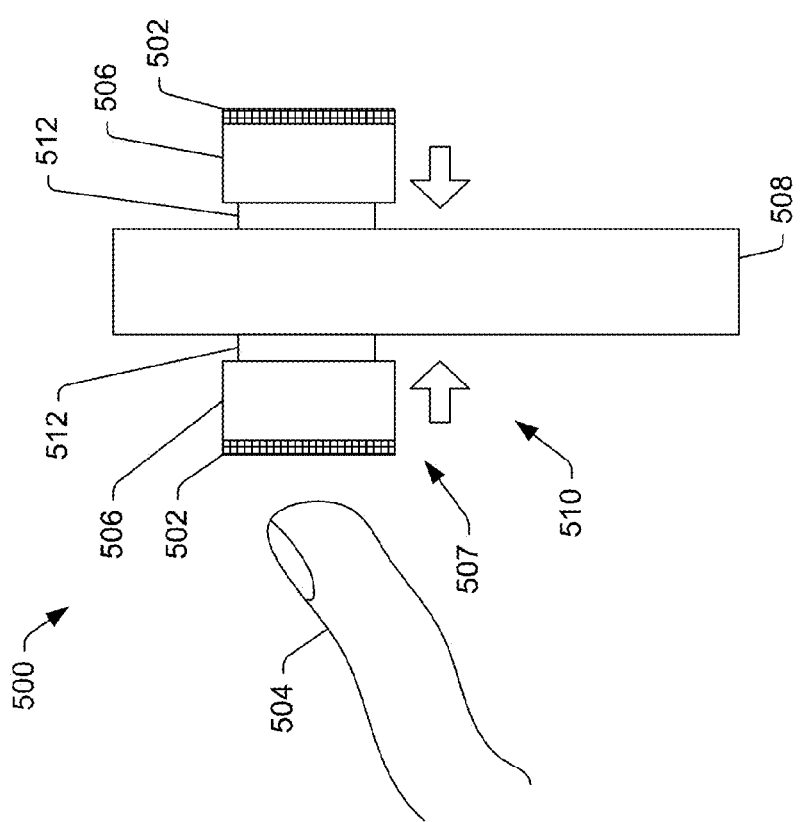
FIG. 5 shows a side elevation view of an illustrative joint locking mechanism in a first state that restraints movement of a structure.

FIG. 5 shows a side elevation view of an illustrative joint locking mechanism 500. The joint locking mechanism may transition between a first state (or position) that restraints movement of a first structure (and/or the joint) and a second state (or position) that allows movement of the first structure (and/or the joint) relative to a second structure based on a presence or absence of an extremity of a user.

In accordance with various embodiments, the joint locking mechanism 500 may include a presence detector 502 (which may be the same as the presence detector 146) that may sense a presence of an extremity 504 of a user, such as a finger, hand, or tool used by the user. The presence detector 502 may be in communication with an actuator 506 of a second structure 507. The actuator 506 may directly or indirectly engage a structure 508 (or "first" structure") to prevent movement of the structure 508 relative to the actuator 506 and relative to the second structure 507 when the actuator is in a first state (or position). The actuator 506 may transition to a second state (or position) where the actuator is directly or indirectly disengaged from the structure 508, and thereby allows movement of the structure relative the actuator 506. The transition of the actuator 506 between the first state and the second state may be caused at least in part by signals transmitted to the actuator 506 from the presence detector 502.

By using the presence detector 502 and the actuator 506, a human may quickly adjust the position of the structure 508 by simply touching the presence detector 502, or moving near the presence detector in some instances, and then moving the structure. When the presence detector 502 is include on the structure (or the part to be moved), then the human may simply grasp the structure at the presence detector and cause the movement of the structure. When the human lets go of (disengages from) the presence detector, the structure 508 may maintain its last position due to the engagement by the actuator 506 caused by an absence of the presence of the extremity (e.g., a discontinuation of a touch, reduced pressure/force of a touch, etc.) sensed by the presence detector 502. Thus, the human may quickly adjust a location or position of the structure 508 that employs the joint locking mechanism described herein.

The presence detector 502 may be any type of sensor that detects the presence of the extremity 504, such as a finger moving near a structure, a finger contacting the presence detector 502, and so forth. The presence detector 502 may be implemented as one or more of various types of sensors, such as a proximity sensor, an electronic field (e-field) sensor, a capacitance sensor, a resistive touch sensor, a camera, and/or other types of sensors that can detect a presence of the extremity 504 near or against a surface.

The presence detector 502 ultimately determines the occurrence of a presence of the extremity 504 (e.g., near touch, touch, contact, or other activating event). In response to the presence of the extremity 504, the presence detector 502 may transmit a signal to another component where the signal indicates the presence of the extremity 504. The presence detector 502 may transmit a continuous signal while the presence detector 504 detects the presence of the extremity 504 or may transmit signals for each change of state (e.g., near touch, touch, termination of touch, reduced pressure of touch, etc.). In some embodiments, the presence detector 502 may transmit the signal directly to the actuator 506, such as by transmitting a change in voltage or other electrical attribute directly to the actuator. However, in some implementations, the presence detector 502 may transmit the signal to a processor (e.g., the processor 122), which in turn may communicate signals (instructions) to the actuator 506.

In some embodiments, the presence detector 502 may determine attributes of the presence of the extremity 504, such as an amount of pressure of a touch, an amount of surface area covered by the touch, the number of fingers used in a touch, a nearness of the extremity 504 and/or other attributes, which may be used by the presence detector to control actuation by the actuator 506.

The actuator 506 may be an electromechanical device that can transition from the first state to the second state, such as a motor, a linear actuator, a piezoelectric actuator, a pneumatic actuator, a hydraulic piston, a relay, a comb drive, a thermal bimorph, a digital micromirror device, an electroactive polymer, a magnetic device, and/or other devices. As shown in FIG. 5, the actuator 506 is in a first state 510 which prevents movement of the structure 508.

In various embodiments, the actuator 506 may include a shaft 512 (i.e., brake, foot, etc.) that translates from a first position to a second position in response to activation of a motor included in the actuator 506. As used herein, the term "motor" includes solenoids and other devices that cause motion based on electrical properties and/or heat. The shaft 512 may use a screw, wheel and axle, flange, or other feature engaged by the motor. However, the actuator 506 may also be implemented without moving parts, such as by use of magnetic fields. For example, the actuator 506 may be implemented using magnets that cause the translation of the shaft and/or attract/repel the structure 508 to engage/disengage the structure, respectively.

In some embodiments, the shaft 512 may physically engage features in the structure 508, such as by inserting a pin into an aperture, ratchet teeth into corresponding opposing teeth, and so forth. The shaft 512 may physically engage the structure 508 by relying on friction. In the latter example, the amount of friction may be controlled by the actuator 506, which may allow a human to cause some movement of the structure 508 when greater amounts of force are exerted on the structure that enables overcoming the friction caused by the actuation 506.

The actuator 506 may engage the structure 508 directly or indirectly. For example, the shaft 512 may contact the structure 508 to prevent movement of the structure. The shaft 512 may contact an intermediary structure, such as a brake, lever, or other device, which may then contract the structure 508. The use of the intermediary may enable mechanical advantage, allow more precise control of the movement of the structure 508, change or inverse the direction of motion caused by the shaft 512, and/or accomplish other design requirements.

In some embodiments, when the shaft 512 creates friction resistance on the structure 508 (either directly or indirectly), the amount of resistance may be correlated to attributes of the touch to the presence detector 502. For example, a presence of the extremity 504 (e.g., a touch) that includes greater pressure may result in less restrained movement of the structure 508 in comparison to a light touch of the presence detector 502. As another example, a size of the touch (e.g., surface area of presence detector 502 that is covered) may also determine an amount of friction or lack of friction being applied by the actuator 506 to the structure 508.

Figure 6:
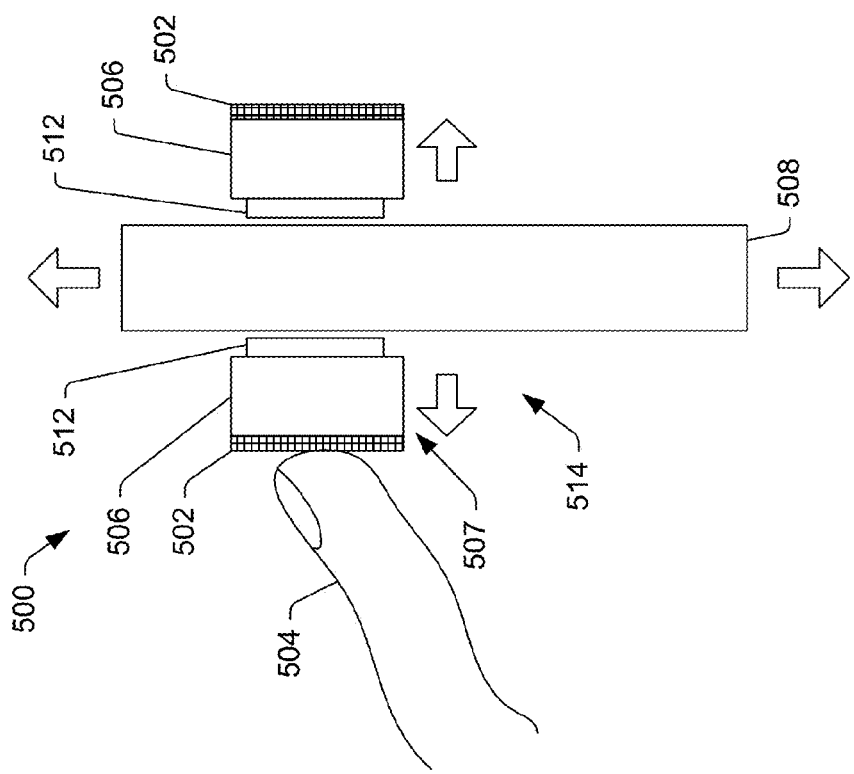
FIG. 6 shows a side elevation view of the illustrative joint locking mechanism of FIG. 5 while in a second state that permits movement of a structure.

FIG. 6 shows a side elevation view of the joint locking mechanism of FIG. 5 while in a second state 514 that permits movement of a structure. As shown in FIG. 6, the extremity 504 may move near and/or contact (touch) the presence detector 502. The presence detector 502 may sense the presence based on a change to an electrical field, pressure on a surface, or other physical change of state. The presence detector 502 may then provide a signal, either directly or indirectly, to the actuator 506 causing the actuator to at least partially release the structure 508 and enable movement of the structure with respect to the actuator 506.

Figure 7:
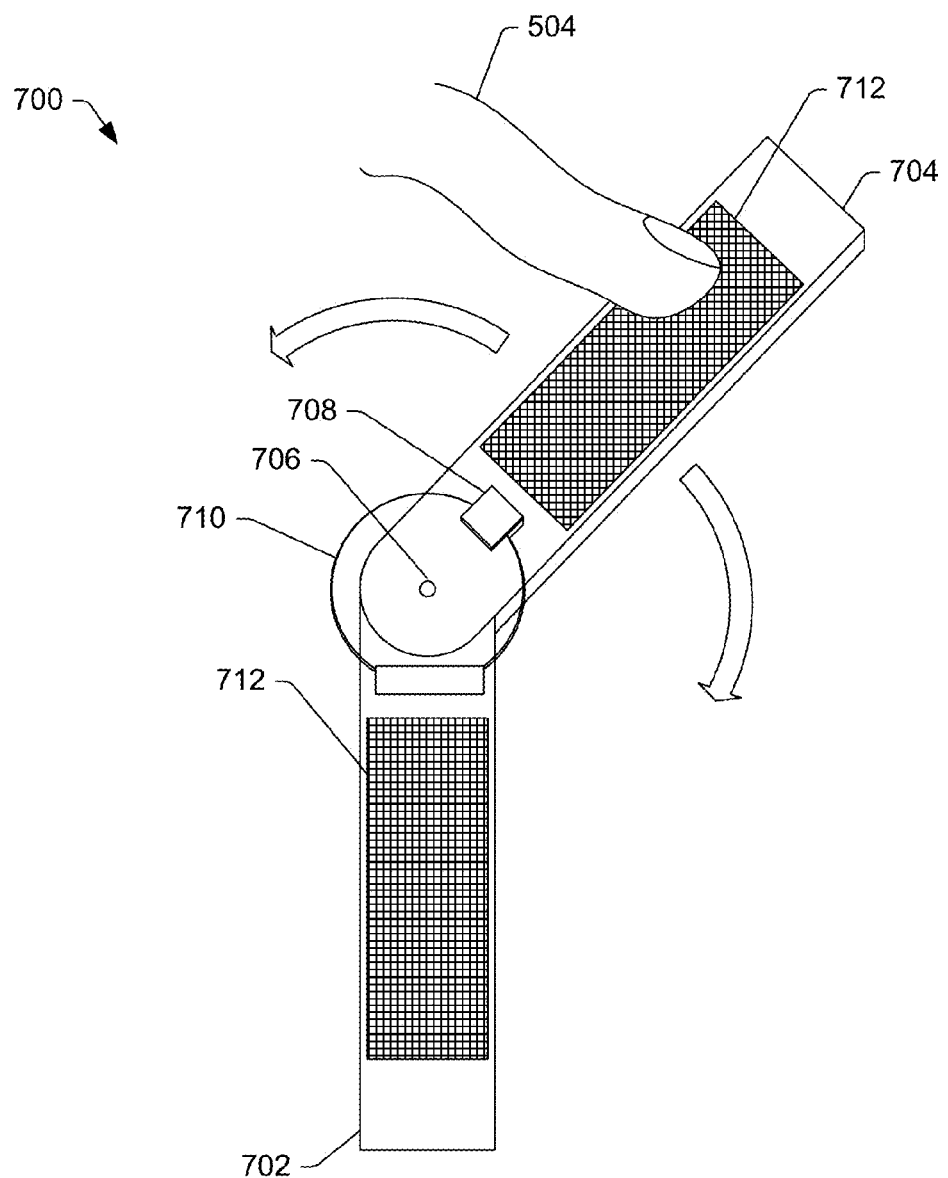
FIG. 7 shows an isometric view of an illustrative elbow joint that includes a joint locking mechanism.

FIG. 7 shows an isometric view of an illustrative elbow joint 700 that includes a joint locking mechanism. The elbow joint 700 may include a first arm 702 (i.e., a first structure) in connection to a second arm 704 (i.e., a second structure) by an axle 706. The second arm 704 and/or the first arm 702 may rotate about the axle 706. At least one of the arms, such as the second arm 704, may include an actuator 708 that causes engagement to or disengagement from an engagement structure 710. The engagement structure 710 may be located on the arm that does not include the actuator 706.

The first arm 702, the second arm 704, or both may include a presence detector 712. The presence detector 712 may operate similar to the presence detector 502 described with reference to FIG. 5. For example, when both arms include the presence detector, then a human may move either arm by moving an extremity near the arm and/or touching the arm at a location of the presence detector or proximate the presence detector, and then moving the arm. When the presence detector 712 detects the presence of the extremity 504, the actuator 708 may cause disengagement of the engagement surface 710, and thus allow the arms to rotate about the axle 706 (i.e., causing an unlocked state). When the presence detector 712 detects an absence of the extremity 504, then the actuator 708 may cause engagement of the engagement surface 710, and thus prevent the arms from rotating about the axle 706 (i.e., causing a locked state). As shown in FIG. 7, the actuator may be analogous to a brake which is disengaged from the engagement surface 710 in response to the presence of the extremity 504 detected by the presence detector 712.

Figure 8:
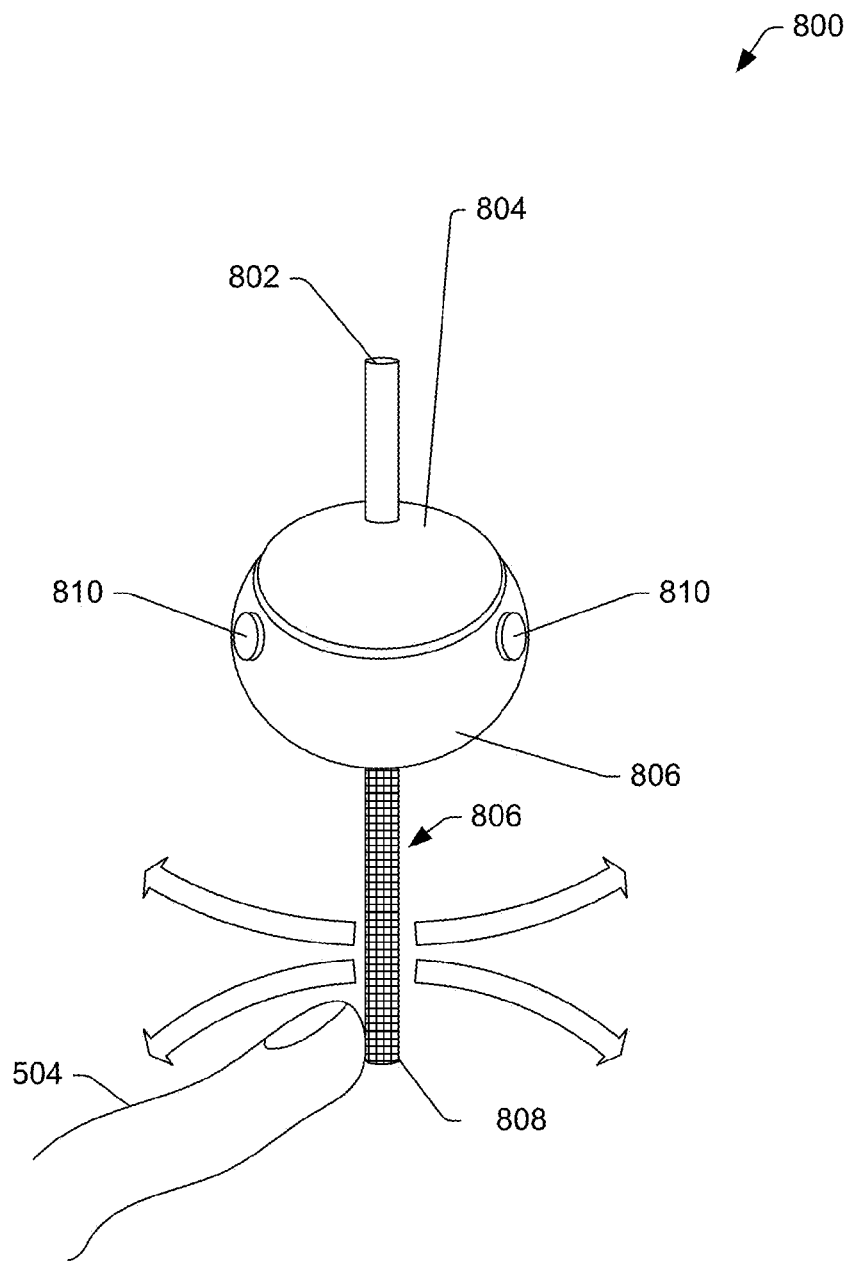
FIG. 8 shows an isometric view of an illustrative ball joint that includes a joint locking mechanism.

FIG. 8 shows an isometric view of an illustrative ball joint 800 that includes a joint locking mechanism. The ball joint 800 may include a first arm 802 (i.e., a first structure) having a ball 804 in connection to a socket 806 of a second arm 808 (i.e., a second structure). The first arm 802 and/or the second arm 808 may move when the ball 804 is moveable within the socket 806.

At least one of the ball 804 or the socket 806 may include an actuator 810 that causes engagement or disengagement between the ball 804 and the socket 806 in response to a signal or signals from a presence detector 812. The presence detector 812 may be similar to the presence detector 502 described with reference to FIG. 5. Thus, an engagement surface may be on the surface of the ball 804 (when the actuator is located on or in the socket 806) or on an interior surface of the socket 806 (when the actuator is located on the ball 804). In some embodiments, multiple actuators may be deployed to enable engagement of the ball 804 and socket 806. The actuator 810 may be the same or similar to the actuator 506 described with reference to FIG. 5.

Figure 9:
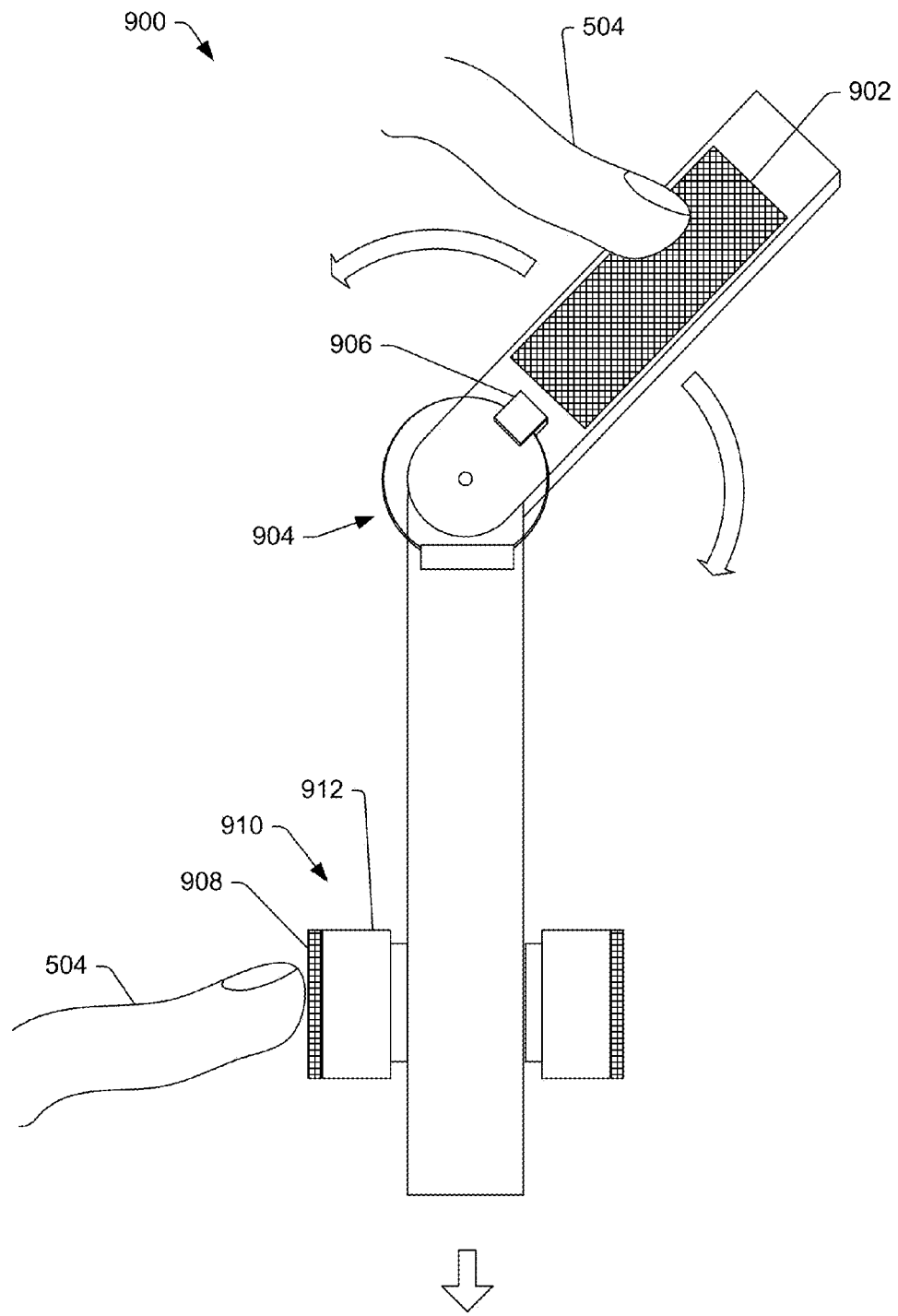
FIG. 9 shows an isometric view of an illustrative apparatus having multiple joints and multiple presence detectors that activate one or more actuators associated with the multiple joints.

FIG. 9 shows an isometric view of an illustrative apparatus 900 having multiple joints and multiple presence detectors that activate one or more actuators associated with the multiple joints. For example, the apparatus 900 may include the joint locking mechanisms shown in FIGS. 5 and 7.

In accordance with some embodiments, the presence detectors located on the apparatus 900 may be associated with particular joints or structures, and may cause actuators to engage or disengage the particular joints or structures when the presence detectors sense the presence of the extremity 504. For example, a first presence detector 902 may be associated with a first joint 904 (e.g., the axle), which may be engaged or disengaged via the first actuator 906. Similarly, a second presence detector 908 may be associated with a second joint 910 (e.g., a sliding joint), which may be engaged or disengaged via a second actuator 912.

In various embodiments, a presence detector may activate a plurality of the actuators and thereby engage or disengage a plurality of joints. For example the first presence detector 902, in response to sensing the presence of the extremity 504, may cause the first actuator 906 and the second actuator 912 to disengage and allow movement of the first joint 904 and the second joint 910. By having a single presence detector cause engagement or disengagement of a plurality of joints, a human may more easily adjust a position and/or reposition a complex structure that includes various joints.

In some embodiments, a presence detector may recognize different types of touch commands caused by the presence of the extremity 504. For example, a presence detector may transmit information to the processors 122 that indicates a number of unique touch points experienced by the presence detector. The number of unique touch points may cause the processor to execute different commands to the actuators. For example, when a single touch point is detected, the processors 122 may transmit a command to a joint associated with or near the particular presence detector. However, when two touch points are detected, the processors 122 may transmit a command to all of the joints in the apparatus or the joints near the presence detector (which may include two or more joints). Thus, the presence detectors may activate a single actuator and/or multiple actuators. Further, the presence detectors may be capable of distinguishing different touch commands caused by the presence of the extremity 504, which may then be used to selectively control the various actuators in an apparatus having multiple actuators associated with multiple joints.

Figure 10:
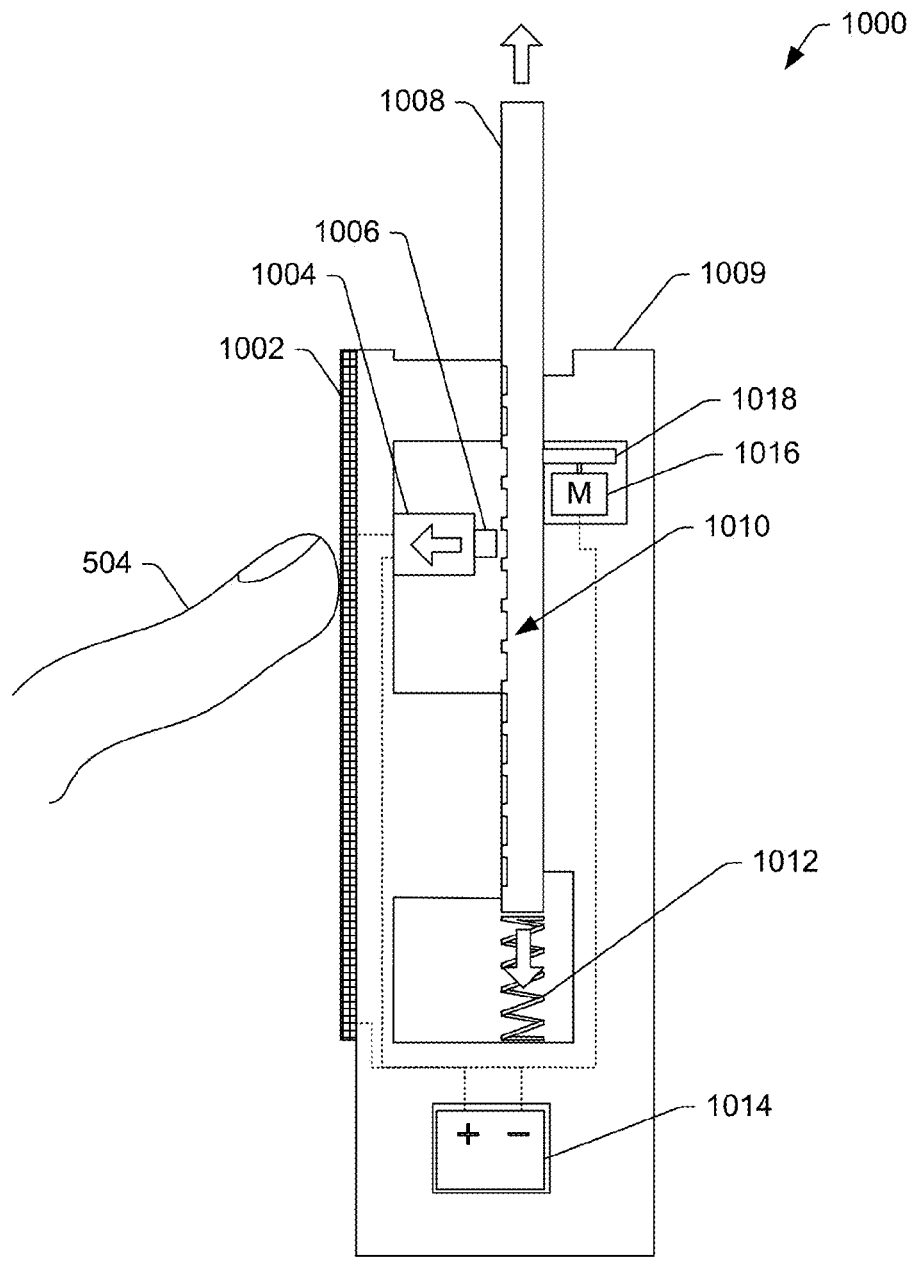
FIG. 10 shows a side elevation view of an illustrative apparatus that includes a biased structure or counterbalance and a joint locking mechanism.
Figure 11:
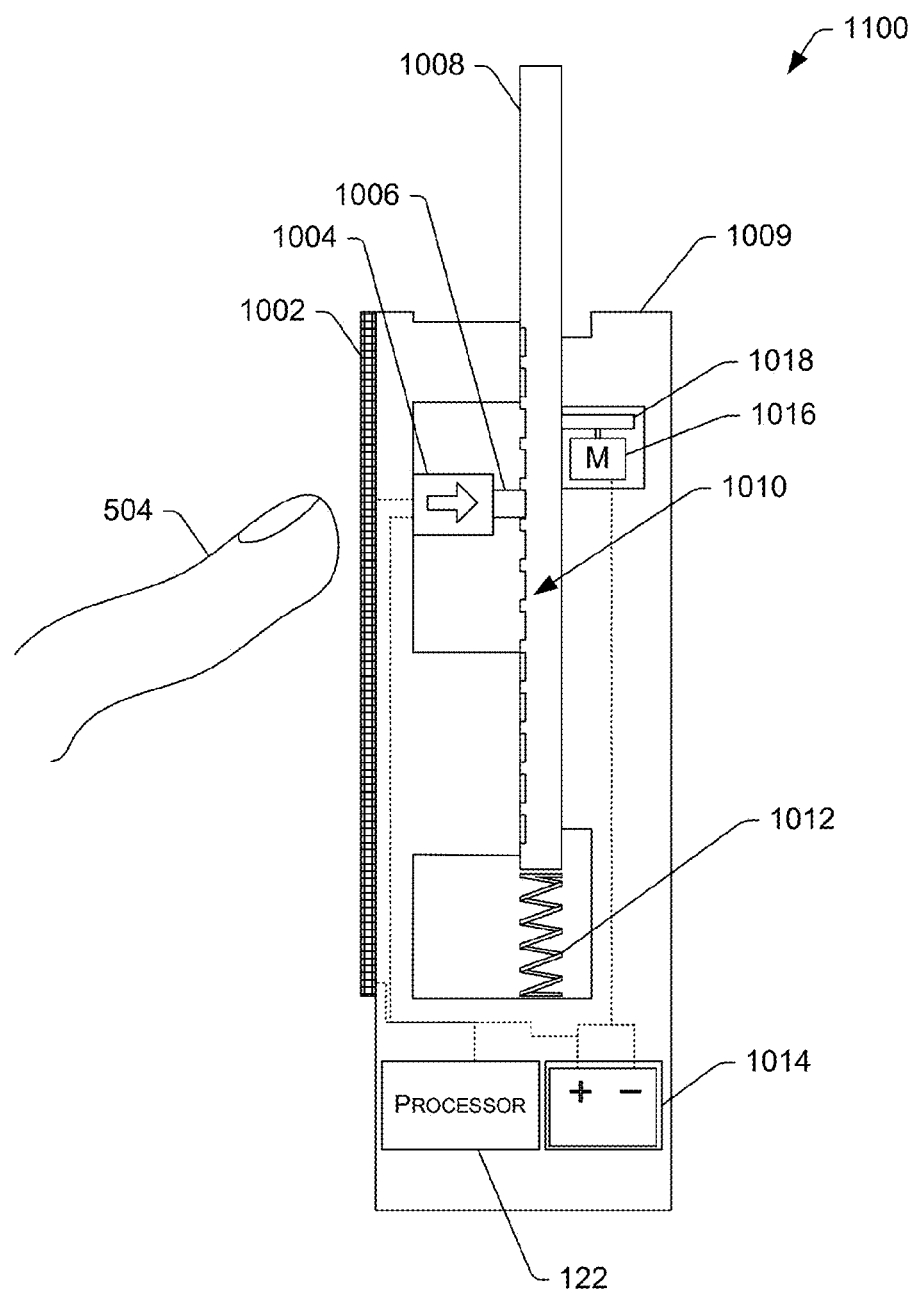
FIG. 11 shows a side elevation view of an illustrative apparatus that includes a biased structure or counterbalance, a joint locking mechanism, and a processor.

FIG. 10 shows a side elevation view of an illustrative apparatus 1000 that includes a biased structure or counterbalance and a joint locking mechanism. The apparatus 1000 may include a presence detector 1002 in communication with an actuator 1004 that may translate a shaft 1006. The shaft may translate from a first position that does not engage a first structure 1008 to a second position that engages the first structure 1008 and prevents the structure from moving relative to a second structure 1009. The apparatus 1000 is shown in the first position in FIG. 10, which allows movement of the first structure 1008 with respect to the actuator 1004 and with respect to the second structure 1009. In some embodiments, the first structure 1008 may include engagement features 1010, such as apertures that receive the shaft and create a physical restraint that prevents the movement of the first structure 1008 when the shaft 1006 is in the second position, as shown in FIG. 11.

Returning to FIG. 10, in accordance with various embodiments, the apparatus 1000 may include a biasing or counterbalance structure (BCS) 1012 that is in physical connection with the first structure 1008 and supports at least a portion of the weight of the first structure 1008. The BCS 1012 may enable a human to more easily move or reposition the first structure 1008 without having to support the entire weight of the first structure 1008. Counterbalances and counter weights are common on apparatus such as desk lamps that have moveable arms. A counter weight may be used to offset at least a portion of a weight of the first structure 1008 or the second structure 1009. Biasing devices may include springs in compression or tension, among other possible biasing devices that support at least a portion of weigh of a structure such as the first structure 1008.

In various embodiments, the presence detector 1002 and the actuator 1004 are in connection with a power supply 1014. The power supply 1014 may use direct current (DC) supplied by one or more batteries and/or may use alternating current (AC) from an external source of electric power.

In some embodiments, the presence detector 1002 may include a direct connection 1006 to the actuator 1004. The presence detector 1002 may transmit a signal, which is indicative of whether the presence detector is touched, to the actuator 1004. The actuator may then transition between the first position and the second position in response to the signal.

The apparatus 1000 may include a motor 1016 that provides movement to the first structure 1008 or another structure or portion of the apparatus 1000. For example, the motor 1016 may engage the first structure 1008 with a drive shaft 1018 to cause rotation of the first structure 1008 when the motor 1016 is in a powered state. However, it may not be ideal to have the motor 1016 in operation and/or the drive shaft 1018 in contact with the first structure 1008 when the structure is to be moved by a human (following disengagement of the actuator 1004). Thus, the presence detector 1002 may cause disengagement of the motor 1016 from acting on the first structure 1008 while the actuator 1004 is placed in the first position (not engaged in the first structure 1008) and may reengage the motor 1016 while the actuator 1004 is placed in the second position (engaged in the structure). In some instances, the presence detector 1002 may cause a reduction of power or torque of the motor 1016 while the actuator 1004 is placed in the first position (not engaged in the first structure 1008) and may resume full power or torque of the motor 1016 while the actuator 1004 is placed in the second position (engaged in the structure).

FIG. 11 shows a side elevation view of an illustrative apparatus 1100 that includes a biased structure or counterbalance, a joint locking mechanism, and a processor. The apparatus 1100 may be similar in some aspects to the apparatus 1000 described above. However, the apparatus 1100 includes the processor 122. The processor 122 may receive the signal from the presence detector 1002 that indicates the presence or absence of the extremity 504. The processor 122 may then activate the actuator 1004 in response to the signal. In some instances, the processor 122 may be in communication with the motor 1016 as discussed above to activate or deactivate the motor.

In various embodiments, the processor 122 may adjust the movement of the actuator 1004 based on a size or pressure of the touch caused by the presence of the extremity 504 sensed by the presence detector 1002, such as when the actuator (via the shaft 1006) engages the first structure 1008 by friction (as opposed to by the engagement features 1010). The adjustment may provide varying levels of friction which may allow a human to move or reposition the structure while the actuator provides some friction to the structure. However, the actuator 1004 may be configured to vary an amount of friction based on strength of a signal received directly from the presence detector 1002. Thus, the actuator 1004 may provide variable amounts of friction to prevent or allow movement of the first structure 1008, where the input to the actuator includes input from the processor 122 or input directly from the presence detector 1002 without use of a processor.

Figure 12:
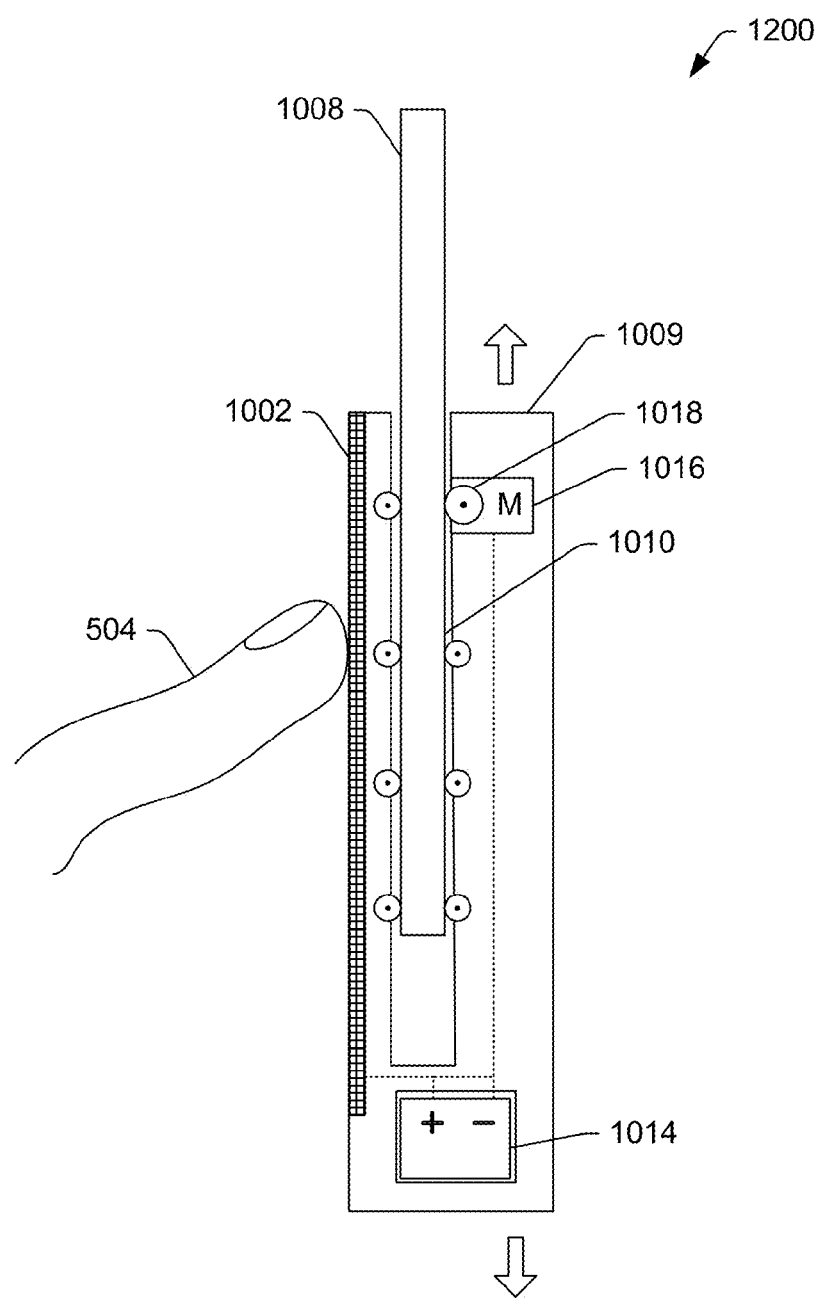
FIG. 12 shows a side elevation view of an illustrative apparatus that includes a motor that operates, in part, as a joint locking mechanism.

FIG. 12 shows a side elevation view of an illustrative apparatus 1200 that includes a motor that operates, in part, as a joint locking mechanism. The apparatus 1200 may be similar in some aspects to the apparatuses 1000 and 1100 described above. However, the apparatus 1200 uses the motor 1016 to perform the functionality of the actuator 1004 and the shaft 1006. Thus, the motor may receive a signal from the presence detector 1002 which may cause to motor to control movement of the structure or allow movement of the structure. The motor may disengage the structure, be powered down, or be powered off to allow the movement of the structure.

In some embodiments, the structure may include features to allow joint locking mechanism determine a new position of the structure and/or joint after movement by a user. For example, when the user moves the first structure 1008, the joint locking mechanism may determine a new location of the structure using sensed data. For example, the joint locking mechanism may employ a proximity detector to determine the new position of the structure, a marking system detectable by a sensor (e.g., marks along the structure to show engagement location, etc.), and/or other devices and/or features to enable the joint locking mechanism to determine a location of the structure that was moved by the user.

FIGS. 13-17 illustrate processes that may be performed to operate the joint lock mechanism discussed herein. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 13:
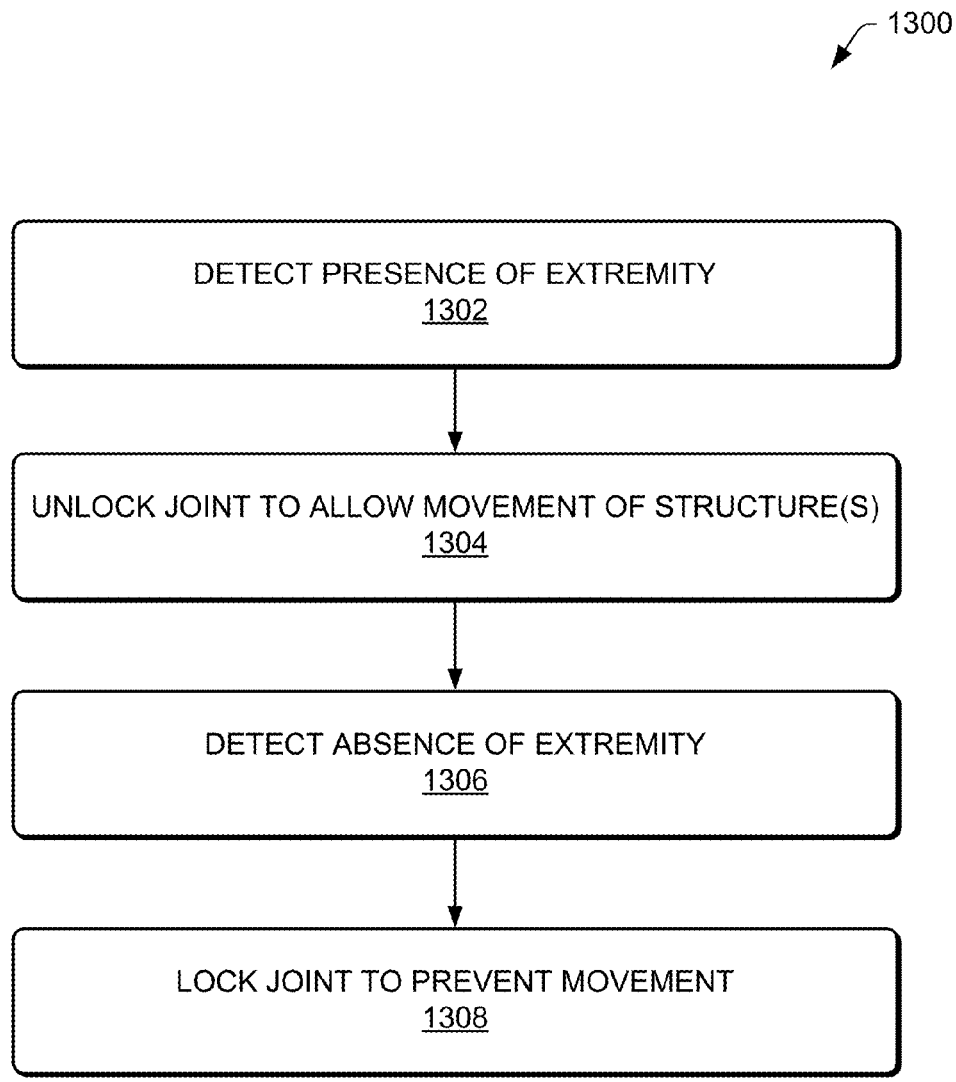
FIG. 13 shows a flow diagram of an illustrative process to selectively lock or unlock a joint using the joint locking mechanism.

FIG. 13 shows a flow diagram of an illustrative process 1300 to selectively lock or unlock a joint using a joint locking mechanism. The process 1300 is described with reference to FIG. 5; however, the process 1300 may be implemented with any of the embodiments described herein.

At 1302, the presence detector 502 may detect a presence of an extremity (e.g., the extremity 504) such as a finger, hand, or tool controlled by a user. The presence detector 502 may generate a signal that indicates the occurrence of the presence of the extremity or the absence of the extremity. The signal may be a continuous signal that exists during the duration of the presence of the extremity (e.g., a persistent signal such as a voltage, etc.) or may be a single signal for each change of state experienced by the presence detector 502 (e.g., near touch state, touched state, no presence state, etc.). In some embodiments, the signal may be proportional to a pressure of a touch and/or the size of the touch caused by the presence of the extremity. The signal may be a binary signal (e.g., on/off) or may be a measure of an electrical property (e.g., voltage, resistance, etc.)

At 1304, the actuator 506 may transition from a first state that prevents movement of the structure 508 to a second state that allows movement of the structure. For example, the actuator 506 may move the shaft 512 from a first position that engages the structure 508, thereby restricting movement of the structure, to a second position that is disengaged from the structure, thereby allowing movement of the structure with respect to the actuator 506. In some instances, the actuator 506 may use a magnetic field to prevent movement of the structure 508. Thus, the actuator 506 may not include moving parts that engage the structure 508, but rather may use a magnetic field that attracts a ferrous portion of the structure 508, for example.

At 1306, the presence detector 502 may detect an absence of the extremity. For example, the absence of the extremity may be an absence of a touch of the extremity against the presence detector, a reduction of pressure of the touch of the extremity, and so forth. The presence detector 502 may generate a signal (or lack thereof) that is indicative of the absence of the extremity.

At 1308, the actuator 506 may transition from the second state that allows movement of the structure 508 to the first state that prevents movement of the structure. For example, the actuator 506 may move the shaft 512 from the second position that does not engage the structure 508 to the first position that engages the structure.

Figure 14:
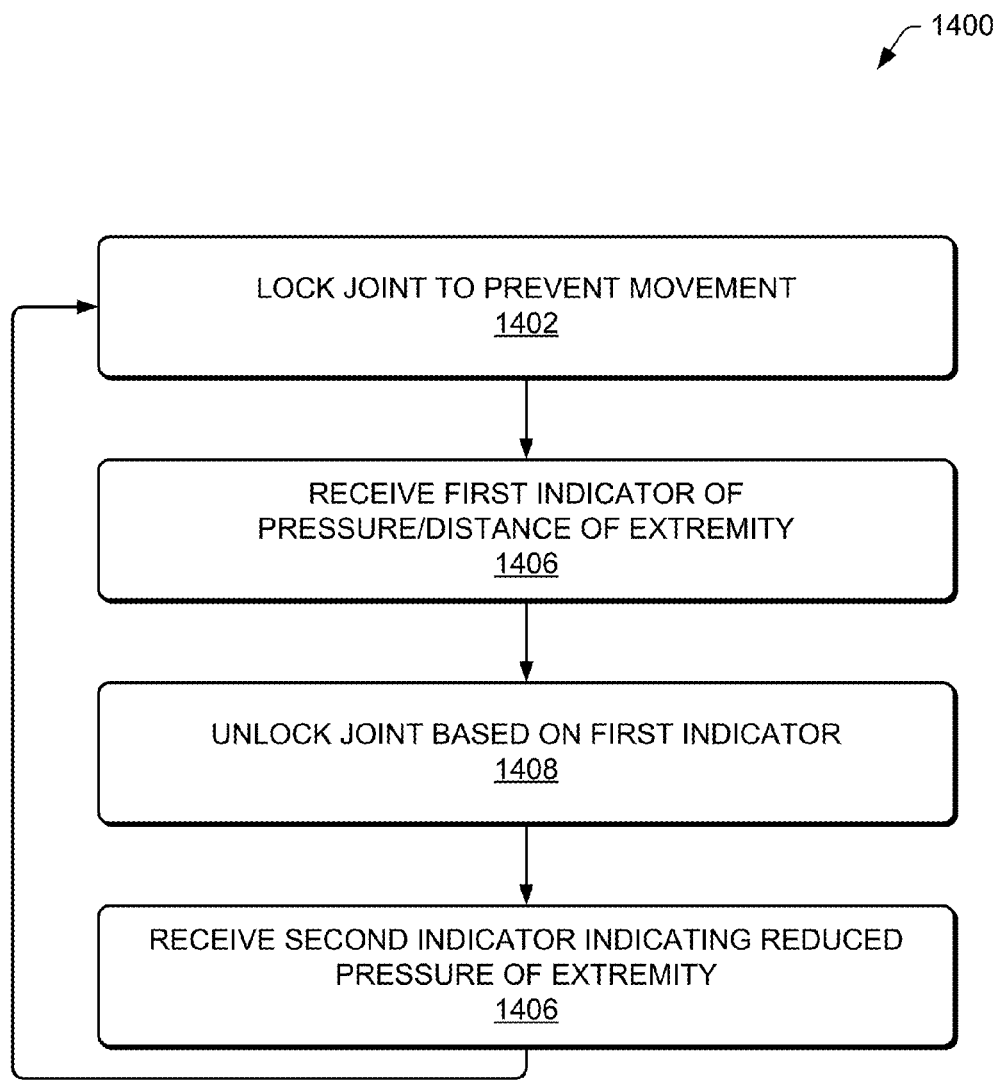
FIG. 14 shows a flow diagram of another illustrative process to selectively lock or unlock a joint using the joint locking mechanism.

FIG. 14 shows a flow diagram of another illustrative process to selectively lock or unlock a joint using the joint locking mechanism. The process 1400 is described with reference to FIG. 5; however, the process 1400 may be implemented with any of the embodiments described herein.

At 1402, the actuator 506 may lock the joint to prevent movement of the structure(s).

At 1404, the presence detector 504 may receive a first indicator of a presence of the extremity, such as pressure (i.e., force) of a touch caused by the extremity, a distances between the extremity and a surface monitored by the proximity detector, and so forth. For example, the first indictor may be a touch by the user. In some instances, the presence detector may determine an amount of pressure of the touch one or more times during the touch by the user.

At 1406, the actuator 506 may unlock the joint and/or release the structures to allow the user to move structures that were previously locked by the joint locking mechanism.

At 1408, the presence detector 504 may receive a second indicator of a presence of the extremity, such as pressure of a touch caused by the extremity, a distance between the extremity and a surface monitored by the proximity detector, and so forth. The second indicator may be a different indicator than the first indicator. For example, the second indictor may be a reduction in pressure of a touch by the user. Following the operation 1306, the actuator 506 may lock the joint as discussed in the operation 1302. By having the second indicator occur while the user still engages the structure, the movement of the structure caused by the user may be maintained without any backlash or unintended movement by the structure after a point when the user desires the actuator 506 to lock the joint/structure (e.g., after the user lets go of the structure). By sensing a reduction in pressure of a touch by the user, the joint locking mechanism may function in an intuitive manner that appears to anticipate the user's desire to have the joint locking mechanism translate between the locked state (the operation 1302) and the unlocked state (the operation 1306).

Figure 15:
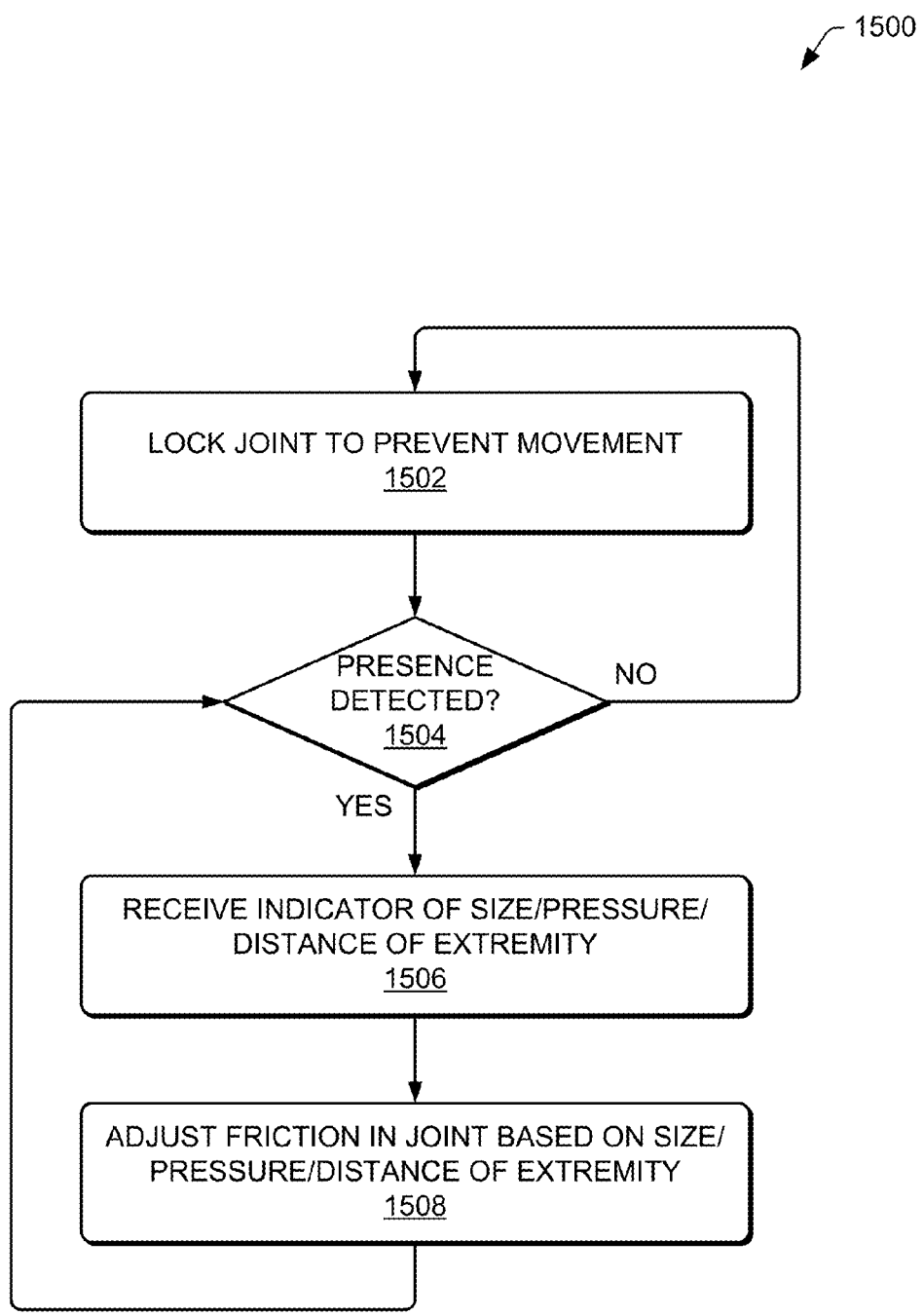
FIG. 15 shows a flow diagram of an illustrative process to adjust the joint locking mechanism based on a size, pressure, or distance of an extremity detected by a presence detector.

FIG. 15 shows a flow diagram of an illustrative process 1500 to adjust the joint locking mechanism based on a size, pressure, or distance of an extremity detected by a presence detector. The process 1500 is described with reference to FIG. 5; however, the process 1500 may be implemented with any of the embodiments described herein.

At 1502, the actuator 506 may lock a joint or structure and thereby prevent movement of the joint or structure. The actuator 506 may lock the joint or structure by providing a high amount of pressure against the joint or the structure to cause friction that overcomes forces (e.g., gravity, human action, etc.) that would otherwise cause movement of the joint or structure.

At 1504, the presence detector 502 may determine whether a presence of the extremity is detected. For example, the presence detector 502 may determine the presence by a change in an electrical field (e-field sensor), a change in capacitance (capacitance sensor) or a change in pressure against a surface (resistive touch sensor). Optical sensors may also be used to determine a touch by an extremity or proximity of the extremity (e.g., finger that is close to touching a movable joint, etc.). Regardless of the type of touch sensor, the presence detector 502 may experience or cause a change in an electrical property (e.g., voltage, resistance, amperage, etc.), which may be outputted as a signal. This change in the electrical properties may be variable based on a nearness of the extremity, a size of a touch by the extremity, the pressure of the touch by the extremity, and/or other attributes of the presence of the extremity (e.g., multiple fingers, etc.). Thus, the signal may indicate information about the type of presence of the extremity.

When the presence detector 502 detects an absence of the extremity 504 (following the "no" route from the decision operation 1504), then the process 1500 may loop back to the operation 1502. The decision operation 1504 may conduct a comparison of a measured value against a threshold value to distinguish between the presence and absence of the extremity.

When the presence detector 502 detects a presence of the extremity 504 (following the "yes" route from the decision operation 1504), then the process 1500 may continue to the operation 1506. At 1506, the actuator 506 may receive an indicator of the size, pressure, and/or distance of the extremity based on the signal from the presence detector 502. When a processor controls the actuator 506 (such as the processor 122 shown in FIG. 11), then the indicator of the size, pressure, and/or distance of the extremity pressure may be provided to the actuator 506 by the processor (e.g., the processor 122).

At 1508, the actuator 506 may adjust a state of operation to adjust an amount of friction in the joint or structure, and thus permit some movement of the joint or structure. For example, when the presence is detected as a light touch (minimal surface area of an extremity and/or little pressure), then the actuator 506 may continue to generate a relatively high amount of friction to prevent easy movement of the joint or structure. In comparison, when the presence is detected as a forceful touch (larger surface area of finger(s) and/or high pressure), then the actuator 506 may generate little or no friction and thereby allow relatively easy movement of the joint or structure. Of course, the actuator 506 may provide the inverse operation (light touch equals less friction) in some embodiments.

Following the operation 1508, the process 1500 may return to the operation 1504. The process 1500 is described as a loop for discussion purposes. Thus, the loop may enable continual changes in the friction generated (or lack of friction generated) by the actuator 506 against the joint or structure based on signals from the presence detector 502. The loop may be implemented by software executable by the processor 122 when a processor controls the actuator 506 based on inputs from the presence detector 502. The loop may be performed by a direct connect between the presence detector 502 and the actuator 506 by continually providing updated signals (e.g., voltage readings, etc.) from the presence detector 502 to the actuator 506 to control the amount of friction applied by the actuator 506 to the joint or the structure.

Figure 16:
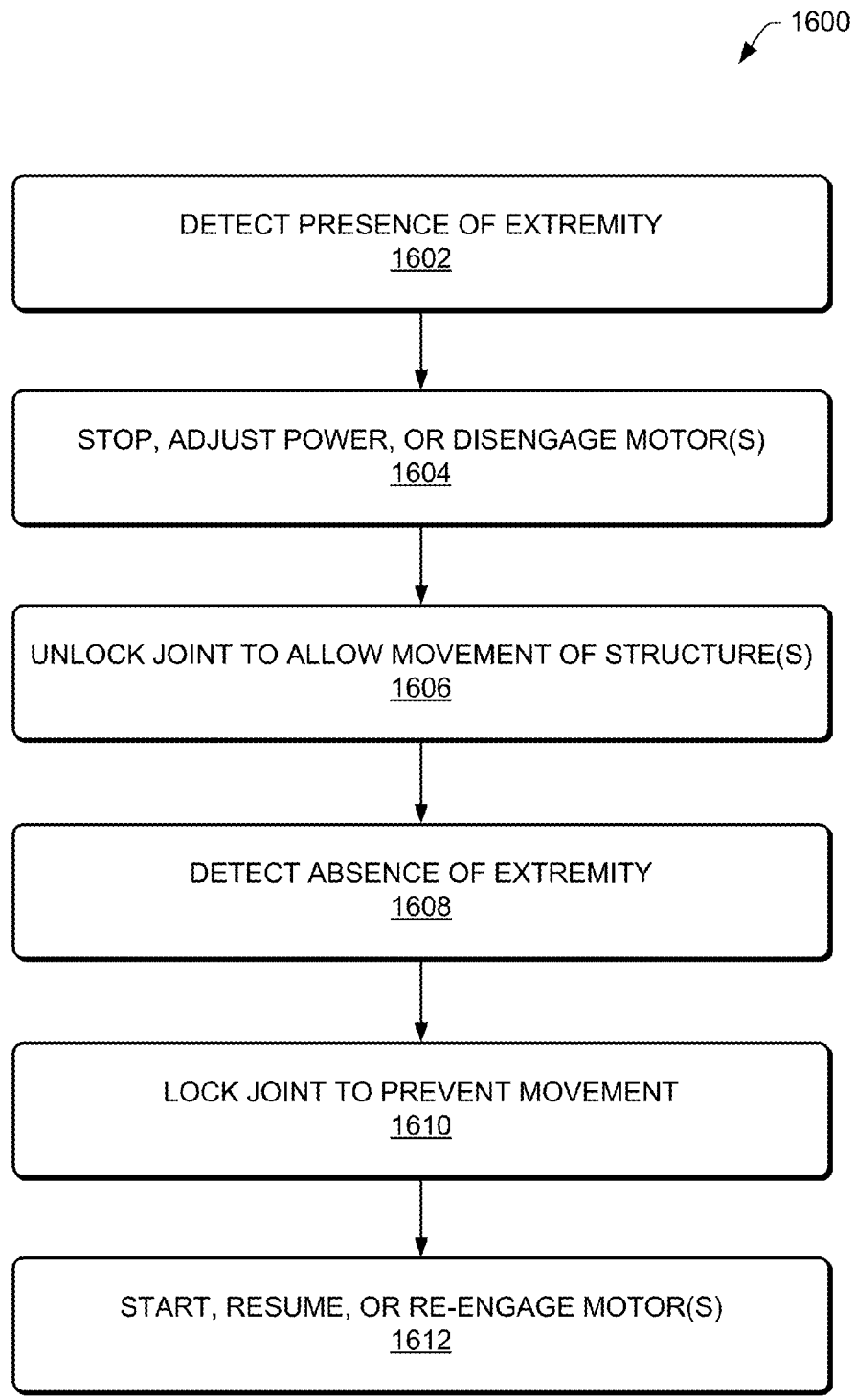
FIG. 16 shows a flow diagram of an illustrative process to disengage a motor and then selectively lock or unlock a joint using the joint locking mechanism.

FIG. 16 shows a flow diagram of an illustrative process 1600 to disengage a motor and then selectively lock or unlock a joint using the joint locking mechanism. The process 1600 is described with reference to FIG. 10; however, the process 1600 may be implemented with any of the embodiments described herein.

At 1602, the presence detector 1002 may detect a presence of an extremity. The presence detector 1002 may generate a signal that indicates the occurrence of a presence of the extremity, or possibly an absence of the extremity.

At 1604, the motor 1016 may disengage from the first structure 1008 or from another structure, reduce power/torque and/or stop operation. In some instances, the shaft 1018 may disengage from the first structure 1008. The motor 1016 and/or the shaft 1018 may not have direct connection with the structure, but may be disengaged or stopped to prevent possible damage to operation of the apparatus 1000.

At 1606, the actuator 1004 may transition from a first state that prevents movement of the first structure 1008 to a second state that allows movement of the structure. For example, the actuator 1004 may move the shaft 1006 from a first position that engages the first structure 1008, thereby restricting movement of the structure, to a second position that is disengaged from the structure, thereby allowing movement of the structure with respect to the actuator 1004.

At 1608, the presence detector 1002 may detect an absence of the extremity 504. The presence detector 1002 may generate a signal (or lack thereof) that is indicative of the absence of the extremity.

At 1610, the actuator 1004 may transition from the second state that allows movement of the first structure 1008 to the first state that prevents movement of the structure. For example, the actuator 1004 may move the shaft 1006 from the second position that does not engage the first structure 1008 to the first position that engages the structure.

At 1612, the motor 1016 may re-engage the first structure 1008 or another structure, power up, and/or start operation. In some instances, the shaft 1018 may re-engage to the first structure 1008.

Figure 17:
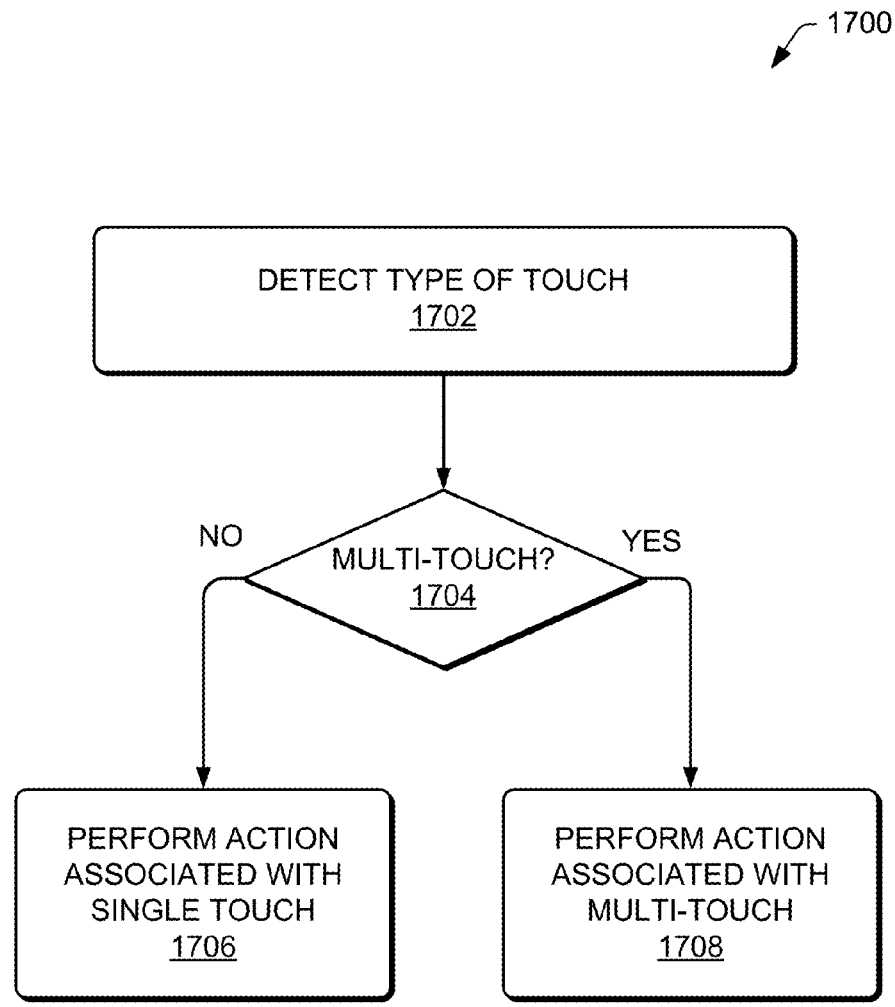
FIG. 17 shows a flow diagram of an illustrative process to detect a type of touch by a presence detector and then take an action associated with the detected type of touch by the presence detector.

FIG. 17 shows a flow diagram of an illustrative process 1700 to detect a type of touch by a presence detector and then take an action associated with the detected type of touch by the presence detector. The process 1700 is described with reference to FIG. 9; however, the process 1700 may be implemented with any of the embodiments described herein.

At 1702, the presence detector may determine a type of touch by the extremity 504. The touch may be a touch of a single finger, a touch by two or more fingers, or other types of recognizable touch events.

At 1704, a determination of the type of touch may be made. When the touch is determined to be a single touch (following the "no" route from the decision operation 1704, then the process 1700 may advance to an operation 1706. At 1706, one or more actuators may operate in accordance with a command associated with the single touch. For example, when the first presence detector 902 detects a single touch, the presence detector 902 may cause the first actuator 906 to release the joint 904 while causing the second actuator 912 to remain engaged to prevent movement of the second joint 910.

When the touch is determined to be a multi-touch (following the "yes" route from the decision operation 1704, then the process 1700 may advance to an operation 1708. At 1708, one or more actuators may operate in accordance with a command associated with the multi-touch. For example, when the first presence detector 902 detects a multi-touch, the presence detector 902 may cause the first actuator 906 to release the joint 904 while causing the second actuator 912 to release the second joint 910.

The operations 1706 and 1708 are illustrative examples of possible operations that may result from detection of different types of touch events by the presence detector(s). The operations may be implemented by the processor 122 in some embodiments. Similar types of operations may be implemented that include operation of actuators located near a touched presence detector (e.g., connected to the same structure, on a same arm of an apparatus, etc.), and so forth to provide actuation results based on the type of touch event detected by a presence detector.

The joint locking mechanism described herein may be implemented in the arm of the ARFNs 102(1)-(3). More specifically, the joint locking mechanism may be implemented in the movable arm mechanism 406 or other movable parts of the table lamp 400.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. An apparatus comprising:
   a first structure;
   a second structure;

a joint coupling the first structure to the second structure and facilitating movement of the second structure relative to the first structure;

an actuator configured to transition between a first position that restricts the movement of the second structure relative to the first structure and a second position that allows the movement of the second structure relative to the first structure;

a touch sensor, located on at least one of the first or second structure and in communication with the actuator, the touch sensor, in response to receiving a touch input, to send a signal to the actuator to cause the actuator to transition between the first position and the second position, the touch sensor further translating a force of the touch input to cause the movement of the second structure from a first location relative to the first structure to a second location relative to the first structure, wherein detection by the touch sensor of an absence of the touch input causes the actuator to return to the first position and restrict the second structure at the second location relative to the first structure; and a power source to provide electrical power to at least one of the touch sensor or the actuator.

2. The apparatus as recited in claim 1, wherein the touch sensor is a resistive touch sensor.

3. The apparatus as recited in claim 1, wherein the touch sensor is a capacitance sensor capable of detecting a change in a capacitance of a capacitor.

4. The apparatus as recited in claim 1, wherein the joint is at least one of an elbow joint, a ball and socket joint, or a linear traversing joint.

5. The apparatus as recited in claim 1, wherein the actuator is at least one of a motor, a linear actuator, a piezoelectric actuator, or a pneumatic actuator.

6. An apparatus comprising:
a first structure;
a second structure;
a joint that facilitates movement of the second structure from a first location relative to the first structure to a second location relative to the first structure;
an actuator configured to transition between at least a first state that restricts movement of the second structure relative to the first structure and a second state that allows movement of the second structure relative to the first structure; and
a sensor to:
detect presence of an extremity of a person, and in response to detecting the presence, transmit a signal to the actuator to cause the actuator to transition from the first state to the second state to free the joint to facilitate the movement between the first structure and the second structure; and
detect absence of the extremity of the person and cause the actuator to return to the first state and restrict the joint to maintain the second structure at the second location relative to the first structure.

7. The apparatus as recited in claim 6, wherein the sensor is a presence detector located on at least one of the first or second structure.

8. The apparatus as recited in claim 6, wherein the actuator restricts movement of the second structure relative to the first structure by causing friction between the actuator and at least one of the joint, the first structure or the second structure.

9. The apparatus as recited in claim 8, wherein the sensor is configured to determine at least one of a force of a touch caused by the extremity of the person against a surface or a distance of the extremity from the surface, and wherein an amount of friction applied by the actuator is based at least in part on the at least one of the force of the touch caused by the extremity of the person against the surface or the distance of the extremity of the person from the surface.

10. The apparatus as recited in claim 6, wherein the joint is a first joint and the actuator is a first actuator, and further comprising a second joint and a second actuator, wherein the sensor is configured to transmit a signal to the second actuator to cause the second actuator to transition from the first state to the second state.

11. The apparatus as recited in claim 6, wherein sensor is at least one of an electric field sensor, a resistive touch sensor, a capacitance sensor, or an optical sensor.

12. The apparatus as recited in claim 6, wherein the actuator is one or more of a solenoid or a motor.

13. The apparatus as recited in claim 6, further comprising one or more processors in communication with the sensor and the actuator, and wherein transmitting the signal to the actuator comprises transmitting the signal to the one or more processors, which in turn transmit the signal to the actuator.

14. The apparatus as recited in claim 6, wherein at least one of the first structure or the second structure is counter balanced by a counter weight that offsets at least a portion of a weight of the first structure or the second structure.

15. The apparatus as recited in claim 6, wherein at least one of the first structure or the second structure is subjected to a force by a biasing device that supports at least a portion of weigh of the first structure or the second structure.

16. The apparatus as recited in claim 6, further comprising a motor to cause motion of at least one of the first structure or the second structure, and wherein the sensor transmits another signal to the motor to cause the motor to be disengaged or powered off in response to the sensor transmitting the signal to the actuator to cause the actuator to operate in the second state.

17. A system comprising:
a joint locking mechanism including a sensor and an actuator, the sensor to detect presence of an extremity, and in response, transmit a signal to cause the actuator to transition from a first state to a second state; and
a joint having a base and a structure, the structure restricted from transitioning or rotating while at a first location while the actuator is in the first state, the structure to at least one of transition or rotate from the first location to a second location relative to the base when the actuator is in the second state, the structure restricted from transitioning or rotating back to the first location relative to the base in response to the actuator resuming the first state.

18. The system as recited in claim 17, further comprising one or more processors; and
wherein the one or more processors receive the signal from the sensor, and in response transmit another signal to the actuator to cause the actuator to transition from the first state to the second state.

19. The system as recited in claim 18, wherein the sensor classifies the detected presence of the extremity as a single touch contact in response to the extremity contacting the sensor in a single location and classifies the detected presence of the extremity as a multi-touch contact in response to the extremity contacting the sensor in multiple locations simultaneously, and wherein the one or more processors transmit at least one additional signal to cause the actuator and another actuator to transition based on the detected presence of at least one of the single touch contact or the multi-touch contact.

20. The system as recited in claim 17, wherein the actuator restricts movement of the structure relative to the base by causing friction between the actuator and at least one of the joint or the structure.

21. The system as recited in claim 20, wherein an amount of the friction applied by the actuator to restrain movement of the structure relative to the base is based at least in part on a force detected by the sensor when the extremity contacts the sensor.

22. An apparatus comprising:
a first structure;
a second structure moveably coupled to the first structure, the second structure to move, while coupled to the first structure, from a first location relative to the first structure to a second location relative to the first structure;
an actuator configured to transition between at least a first state that restricts movement of the second structure relative to the first structure and a second state that allows movement of the second structure relative to the first structure; and
a sensor to detect presence of an extremity of a person, and in response to detecting the presence, transmit a signal to the actuator to cause the actuator to transition from the first state to the second state to permit the movement between the first structure and the second structure, the sensor to further detect absence of the presence of the extremity of the person and causes the actuator to return to the first state and restrict the second structure at the second location relative to the first structure.

23. The apparatus as recited in claim 22, wherein the actuator restricts movement of the second structure relative to the first structure by causing friction between the actuator and at least one of the first structure or the second structure.

24. The apparatus as recited in claim 22, wherein at least one of the first structure or the second structure is subjected to a force by a biasing device that supports at least a portion of weigh of the first structure or the second structure.

25. The apparatus as recited in claim 22, wherein at least one of the first structure or the second structure is counter balanced by a counter weight that offsets at least a portion of a weight of the first structure or the second structure.

26. The apparatus as recited in claim 22, further comprising one or more processors in communication with the sensor and the actuator, and wherein transmitting the signal to the actuator comprises transmitting the signal to the one or more processors, which in turn transmit the signal to the actuator.

* * * * *